(12) United States Patent
Takenaka

(10) Patent No.: US 11,703,592 B2
(45) Date of Patent: Jul. 18, 2023

(54) DISTANCE MEASUREMENT APPARATUS AND DISTANCE MEASUREMENT METHOD

(71) Applicant: Hirokazu Takenaka, Kanagawa (JP)

(72) Inventor: Hirokazu Takenaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 355 days.

(21) Appl. No.: 16/807,418

(22) Filed: Mar. 3, 2020

(65) Prior Publication Data

US 2020/0301010 A1 Sep. 24, 2020

(30) Foreign Application Priority Data

Mar. 19, 2019 (JP) .................. 2019-052005

(51) Int. Cl.
| | |
|---|---|
| *G01S 17/10* | (2020.01) |
| *G01S 17/894* | (2020.01) |
| *G01S 7/481* | (2006.01) |
| *G01S 7/484* | (2006.01) |
| *G01S 7/486* | (2020.01) |

(52) U.S. Cl.
CPC .............. *G01S 17/10* (2013.01); *G01S 7/484* (2013.01); *G01S 7/486* (2013.01); *G01S 7/4815* (2013.01); *G01S 7/4816* (2013.01); *G01S 7/4817* (2013.01); *G01S 17/894* (2020.01)

(58) Field of Classification Search
CPC ...... G01S 17/10; G01S 17/894; G01S 7/4815; G01S 7/4816; G01S 7/4817; G01S 7/484; G01S 7/486
USPC ........................................................ 356/5.01
See application file for complete search history.

(56) References Cited

U.S. PATENT DOCUMENTS

| | | |
|---|---|---|
| 9,506,750 B2 | 11/2016 | Last |
| 2007/0181810 A1 | 8/2007 | Tan et al. |
| 2013/0050405 A1 | 2/2013 | Masuda et al. |
| 2013/0050408 A1 | 2/2013 | Masuda et al. |
| 2013/0235149 A1 | 9/2013 | Tanaka et al. |
| 2013/0242040 A1 | 9/2013 | Masuda et al. |

(Continued)

FOREIGN PATENT DOCUMENTS

| | | |
|---|---|---|
| JP | 2004-247461 | 9/2004 |
| JP | 2014-157044 | 8/2014 |

(Continued)

OTHER PUBLICATIONS

European Extended Search Report for 20160575.5 dated Jul. 15, 2020.

(Continued)

*Primary Examiner* — Nguyen T Truong
(74) *Attorney, Agent, or Firm* — IPUSA, PLLC

(57) ABSTRACT

A distance measurement apparatus includes: a light projector; a sensor to receive light projected from the light projector and reflected from a target object, photoelectrically convert the received light to an electrical signal, and obtain a plurality of phase signals from the electrical signal; and an interface to output distance data indicating a distance to the target object, the distance data being obtained based on the plurality of phase signals. The light projector includes: a plurality of light emitters that are arranged two-dimensionally; and circuitry configured to cause the plurality of light emitters to emit light a plurality of times while shifting positions of the plurality of light emitters.

22 Claims, 23 Drawing Sheets

(56) References Cited

U.S. PATENT DOCUMENTS

| | | |
|---|---|---|
| 2014/0071226 A1 | 3/2014 | Satoh et al. |
| 2014/0071227 A1 | 3/2014 | Takenaka et al. |
| 2014/0078247 A1 | 3/2014 | Shohara et al. |
| 2014/0152852 A1 | 6/2014 | Ito et al. |
| 2015/0015664 A1 | 1/2015 | Masuda et al. |
| 2015/0015766 A1 | 1/2015 | Satoh et al. |
| 2015/0062363 A1 | 3/2015 | Takenaka et al. |
| 2015/0192762 A1 | 7/2015 | Satoh et al. |
| 2015/0222816 A1 | 8/2015 | Shohara et al. |
| 2016/0006907 A1 | 1/2016 | Masuda et al. |
| 2016/0073081 A1* | 3/2016 | Becker .................. G01S 7/51 348/43 |
| 2016/0313541 A1 | 10/2016 | Satoh et al. |
| 2016/0337584 A1 | 11/2016 | Masuda et al. |
| 2016/0349369 A1 | 12/2016 | Lee et al. |
| 2017/0315336 A1 | 11/2017 | Masuda et al. |
| 2018/0024333 A1 | 1/2018 | Satoh et al. |
| 2018/0062345 A1 | 3/2018 | Bills et al. |
| 2019/0086649 A1 | 3/2019 | Satoh et al. |
| 2019/0243110 A1 | 8/2019 | Masuda et al. |

FOREIGN PATENT DOCUMENTS

| | | |
|---|---|---|
| JP | 2015-510108 | 4/2015 |
| JP | 2017-005726 | 1/2017 |
| JP | 2017-505907 | 2/2017 |
| JP | 2018-152632 | 9/2018 |
| JP | 2018-531374 | 10/2018 |
| WO | WO2013/102677 A1 | 7/2013 |
| WO | 2017/189185 | 11/2017 |
| WO | 2018/057084 | 3/2018 |
| WO | 2018/100082 | 6/2018 |

OTHER PUBLICATIONS

Japanese Office Action for 2019-052005 dated Dec. 6, 2022.
Office Action dated Apr. 18, 2023 issued with respect to the basic Japanese Patent Application No. 2019-052005.

* cited by examiner

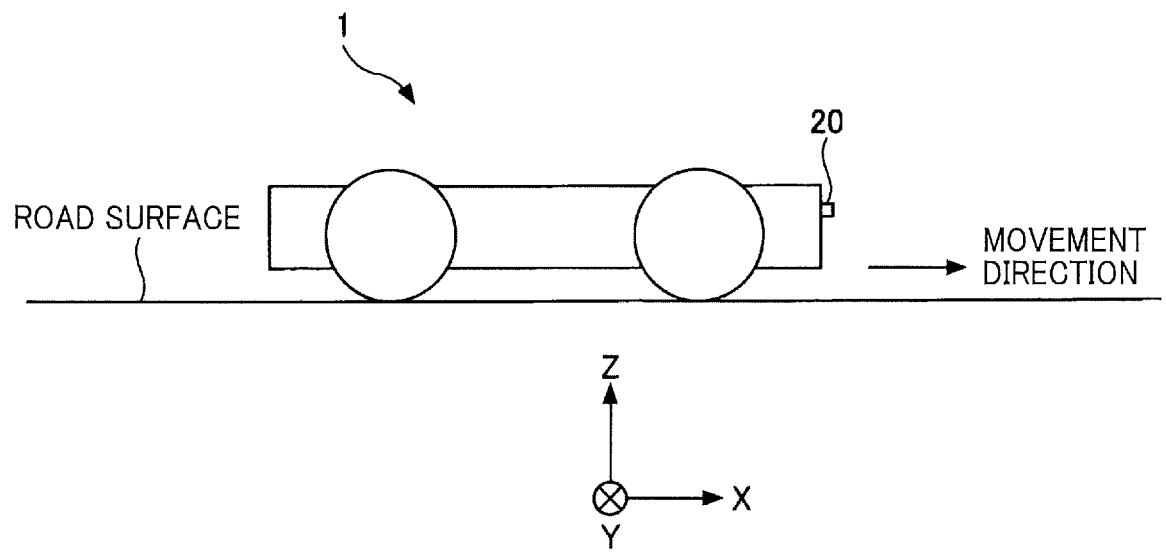
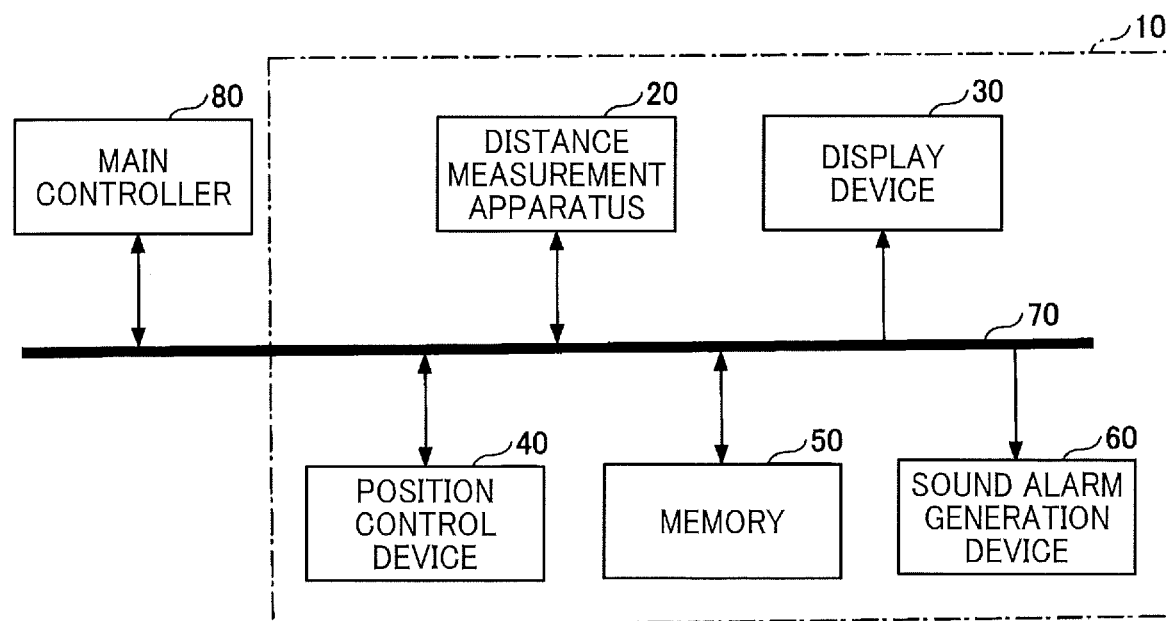

DISTANCE MEASUREMENT APPARATUS AND DISTANCE MEASUREMENT METHOD

CROSS-REFERENCE TO RELATED APPLICATIONS

This patent application is based on and claims priority pursuant to 35 U.S.C. § 119(a) to Japanese Patent Application No. 2019-052005, filed on Mar. 19, 2019, in the Japan Patent Office, the entire disclosure of which is hereby incorporated by reference herein.

BACKGROUND

Technical Field

The present disclosure relates to a distance measurement apparatus and a distance measurement method.

Description of the Related Art

One known distance measurement technique for measuring the distance to a target object is to project light toward the target object to calculate the distance to the target object using the time difference between the projection of light and its reflection. This method is called a time-of-flight (TOF) method. In the TOF method, after light whose intensity is time-modulated into a predetermined state is projected toward a target object, light reflected from the target object is received by a phase signal obtainer, and the time difference between the projection of light and reception of light is detected for each pixel to obtain the distance to the target object. Distance data, which is obtained, is gathered in a bitmap for each pixel and is stored as a "distance image".

Furthermore, a distance measurement apparatus is disclosed that sequentially changes the light projection direction over the entire area to be imaged (the range of the target object) using an actuator in accordance with the relationship in size between the light projecting area and the imaging angle of view of the distance measurement apparatus to obtain a distance image for the entire area to be imaged regardless of the imaging angle of view.

In the disclosed apparatus, the light projection direction is sequentially changed using an actuator, and thus it may take some time to obtain distance data such as a distance image for an entire area to be imaged.

SUMMARY

Example embodiments include a distance measurement apparatus includes: a light projector; a sensor to receive light projected from the light projector and reflected from a target object, photoelectrically convert the received light to an electrical signal, and obtain a plurality of phase signals from the electrical signal; and an interface to output distance data indicating a distance to the target object, the distance data being obtained based on the plurality of phase signals. The light projector includes: a plurality of light emitters that are arranged two-dimensionally; and circuitry to cause the plurality of light emitters to emit light a plurality of times while shifting positions of the plurality of light emitters.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 1 illustrates an example configuration of a mobile object provided with a distance measurement apparatus according to an embodiment;

FIG. 2 is a block diagram illustrating an example hardware configuration of the mobile object according to the embodiment;

Figure 3:
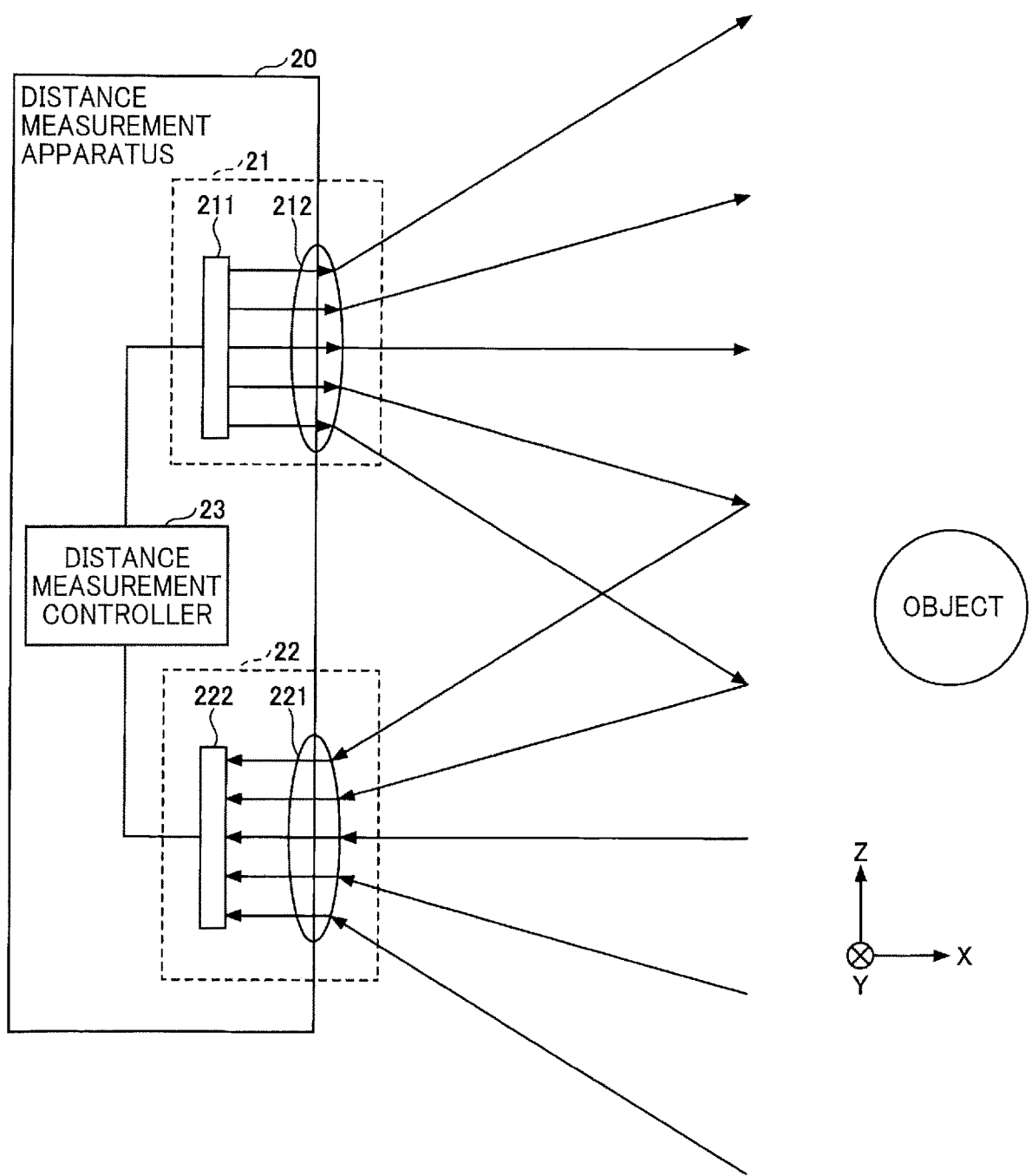
FIG. 3 illustrates an example configuration of a distance measurement apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The following describes embodiments of the present disclosure with reference to the drawings. In the drawings, substantially the same components are identified by the same numerals and are sometimes not described repeatedly.

FIG. 1 illustrates an example configuration of a mobile object 1 provided with a distance measurement apparatus 20 according to an embodiment. The mobile object 1 is an automated guided vehicle configured to transport items to an intended destination without the intervention of a human operator. In the embodiment, the movement direction of the mobile object 1 is an X direction, a direction crossing the road surface is a Z direction, and a direction intersecting both the X direction and the Z direction is a Y direction in the three-dimensional XYZ rectangular coordinate system.

The distance measurement apparatus 20 is attached to a front portion of the mobile object 1 to obtain three-dimensional data such as a distance image indicating a distance in the positive X direction of the mobile object 1. The output of the distance measurement apparatus 20 is used to detect the presence of an obstacle in the positive X direction of the mobile object 1 and position data of the obstacle.

FIG. 2 is a block diagram illustrating an example hardware configuration of the mobile object 1 according to the embodiment. As illustrated in FIG. 2, the mobile object 1 includes the distance measurement apparatus 20, a display device 30, a position control device 40, a memory 50, and a sound alarm generation device 60. These are electrically connected to each other via a bus 70 through which signals and data can be transmitted.

In the embodiment, the distance measurement apparatus 20, the display device 30, the position control device 40, the memory 50, and the sound alarm generation device 60 form a traveling control device 10. The traveling control device 10 is mounted in the mobile object 1. The traveling control device 10 is electrically connected to a main controller 80 of the mobile object 1.

The display device 30 is a display such as a liquid crystal display (LCD) that displays three-dimensional information obtained by the distance measurement apparatus 20 or various settings information related to the mobile object 1. The position control device 40 is an arithmetic unit such as a central processing unit (CPU) that controls the position of the mobile object 1 on the basis of, for example, the three-dimensional data obtained by the distance measurement apparatus 20. The sound alarm generation device 60 is a device such as a speaker that determines whether a collision with an obstacle is avoidable from the three-dimensional data obtained by the distance measurement apparatus 20 and that informs people around the mobile object 1 of the presence of the obstacle if it is determined that a collision with the obstacle is not avoidable.

First Embodiment

Configuration of Distance Measurement Apparatus According to First Embodiment

Next, a distance measurement apparatus according to a first embodiment will be described. FIG. 3 illustrates an example configuration of the distance measurement apparatus 20 according to this embodiment. As illustrated in FIG. 3, the distance measurement apparatus 20 includes a light projector 21, an image capturing device 22, and a distance measurement controller 23. These devices are accommodated in a housing. The housing has a window through which light projected from the light projector 21 and light reflected from an object to which the distance is to be measured (hereinafter also referred to as a "target object") and directed to the image capturing device 22 pass. The window has a pane of glass.

The light projector 21 includes a vertical cavity surface emitting laser (VCSEL) 211 and a light projection optical system 212. The term laser is an acronym for light amplification by stimulated emission of radiation.

The VCSEL 211, which serves as a light source, includes a plurality of light emitters that are two-dimensionally arranged in a YZ plane illustrated in FIG. 3. As described in detail below, the VCSEL 211 includes eight columns of light emitters in the Y direction and eight rows of light emitters in the Z direction. Thus, the VCSEL 211 includes 64 light emitters in total. Each light emitter emits laser light having directivity and a finite angle of divergence in accordance with a drive signal input from the distance measurement controller 23. The term "plurality of light emitters" may be interchangeably referred to as the term "plurality of light-emitting points" or "plurality of light-emitting elements".

The light projection optical system 212 converts the laser light emitted from the VCSEL 211 into divergent light and projects the divergent light in the positive X direction. The light projection optical system 212 is configured using a lens, a mirror, and so on. The light projection optical system 212 can be configured using a wide-angle lens or a fish-eye lens to project laser light across a larger area in the YZ plane.

The laser light emitted from the VCSEL 211 and projected to the target object through the light projection optical system 212 is an example of "light projected from a light projector".

The image capturing device 22 includes an imaging optical system 221 and a time-of-flight (TOF) sensor 222.

The imaging optical system 221 focuses the light projected from the light projector 21 and reflected from the target object located in the positive X direction of the distance measurement apparatus 20 to form an image on a light-receiving surface of the TOF sensor 222. The imaging optical system 221 is configured using a lens, a mirror, and so on. The imaging optical system 221 can be configured using a wide-angle lens or a fish-eye lens to achieve a wider imaging angle of view such that light reflected from the target object over a larger area to be imaged in the YZ plane can be focused to form an image on the light-receiving surface of the TOF sensor 222.

The TOF sensor 222, which is an example of a "phase signal obtainer", has a plurality of pixels that are arranged two-dimensionally. The TOF sensor 222 photoelectrically converts, at each pixel, reflected light from the target object, which is received through the imaging optical system 221, to an electrical signal corresponding to the light intensity of the received light and obtains, for each pixel, a plurality of phase signals from the electrical signal. The TOF sensor 222 can output phase signals obtained for each pixel to the distance measurement controller 23.

The distance measurement controller 23 outputs a drive signal to drive the VCSEL 211 to emit light. Further, the distance measurement controller 23 can obtain a distance image in accordance with the phase signals input from the TOF sensor 222 and output the obtained distance image to the outside of the distance measurement apparatus 20. The hardware configuration and functional configuration of the distance measurement controller 23 will be described.

Figure 4:
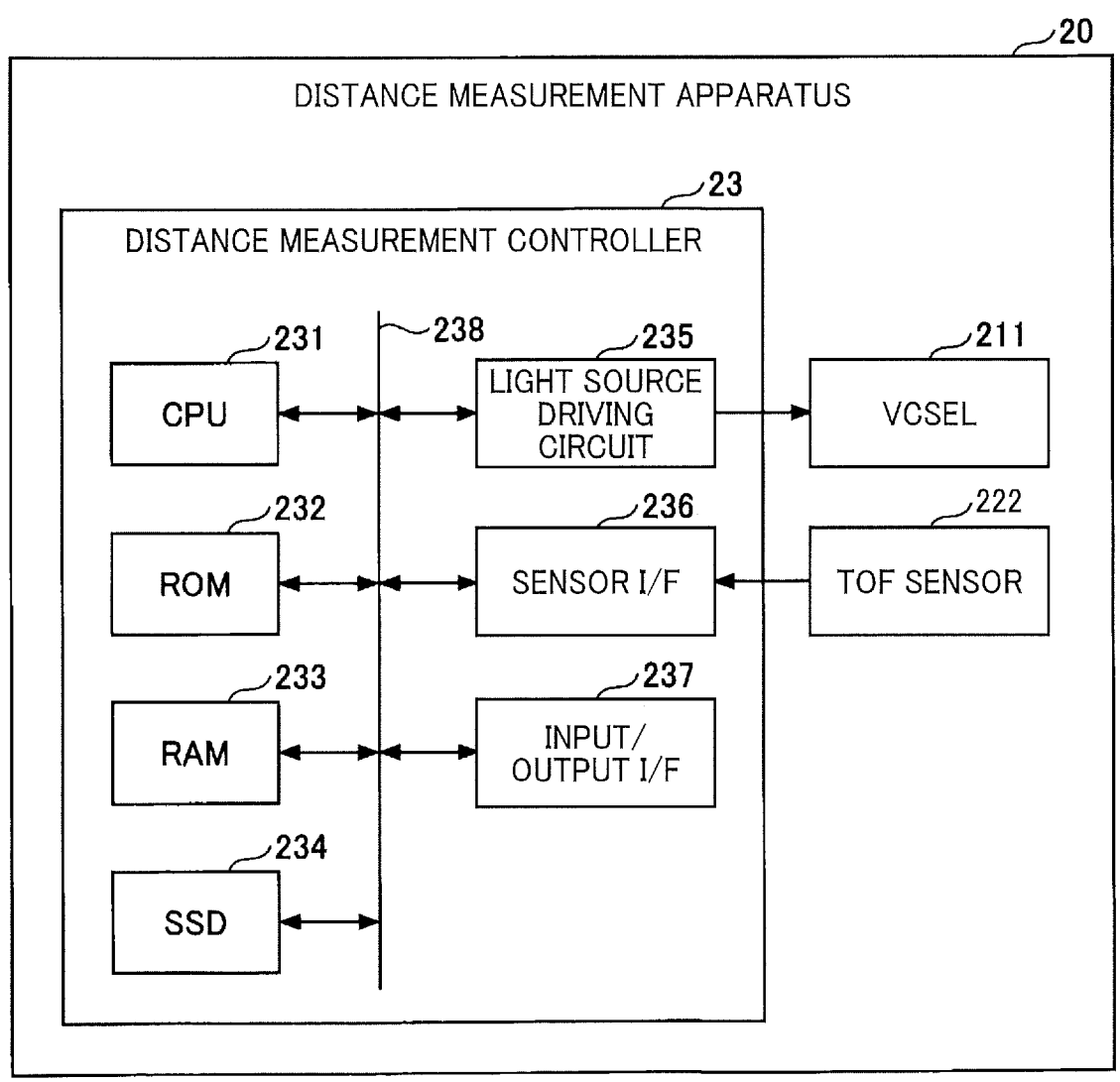
FIG. 4 is a block diagram illustrating an example hardware configuration of a distance measurement controller according to the first embodiment.

Hardware Configuration of Distance Measurement Controller According to First Embodiment FIG. 4 is a block diagram illustrating an example hardware configuration of the distance measurement controller 23 according to this embodiment. As illustrated in FIG. 4, the distance measurement controller 23 includes a CPU 231, a read only memory (ROM) 232, a random access memory (RAM) 233, a solid state drive (SSD) 234, a light source driving circuit 235, a sensor interface (I/F) 236, and an input/output I/F 237. These are electrically connected to each other via a system bus 238.

The CPU 231 reads a program or data onto the RAM 233 from a storage device such as the ROM 232 or the SSD 234 and executes a process to implement the overall control of the distance measurement controller 23 and functions described below. Some or all of the functions of the CPU 231 may be implemented by an electronic circuit such as an application specific integrated circuit (ASIC) or a field-programmable gate array (FPGA).

The ROM 232 is a non-volatile semiconductor memory (storage device) capable of holding a program and data even if power is turned off. The ROM 232 stores a basic input/output system (BIOS) that is executed when the distance measurement controller 23 is started, and programs and data for setting up an operating system (OS) and the like. The RAM 233 is a volatile semiconductor memory (storage device) that temporarily holds programs and data.

The SSD 234 is a non-volatile memory that stores various data and a program used to execute processes of the distance measurement controller 23. The SSD may be implemented as a hard disk drive (HDD), for example.

The light source driving circuit 235 is an electric circuit electrically connected to the VCSEL 211 to output a drive signal such as a drive voltage to the VCSEL 211 in accordance with a control signal input from the CPU 231 or the like. The light source driving circuit 235 drives the plurality of light emitters included in the VCSEL 211 to emit light in accordance with the control signal.

The drive signal may be a rectangular wave, a sine wave, or a voltage waveform of a predetermined shape. The light source driving circuit 235 can change the frequency of the voltage waveform to modulate the frequency of the drive signal, and can cause some of the plurality of light emitters to simultaneously emit light or switch the light emitters to be caused to emit light.

The sensor I/F 236 is an interface electrically connected to the TOF sensor 222 to receive phase signals output from the TOF sensor 222.

The input/output I/F 237 is an interface to be connected to the main controller 80 or an external device such as a personal computer (PC).

Figure 5:
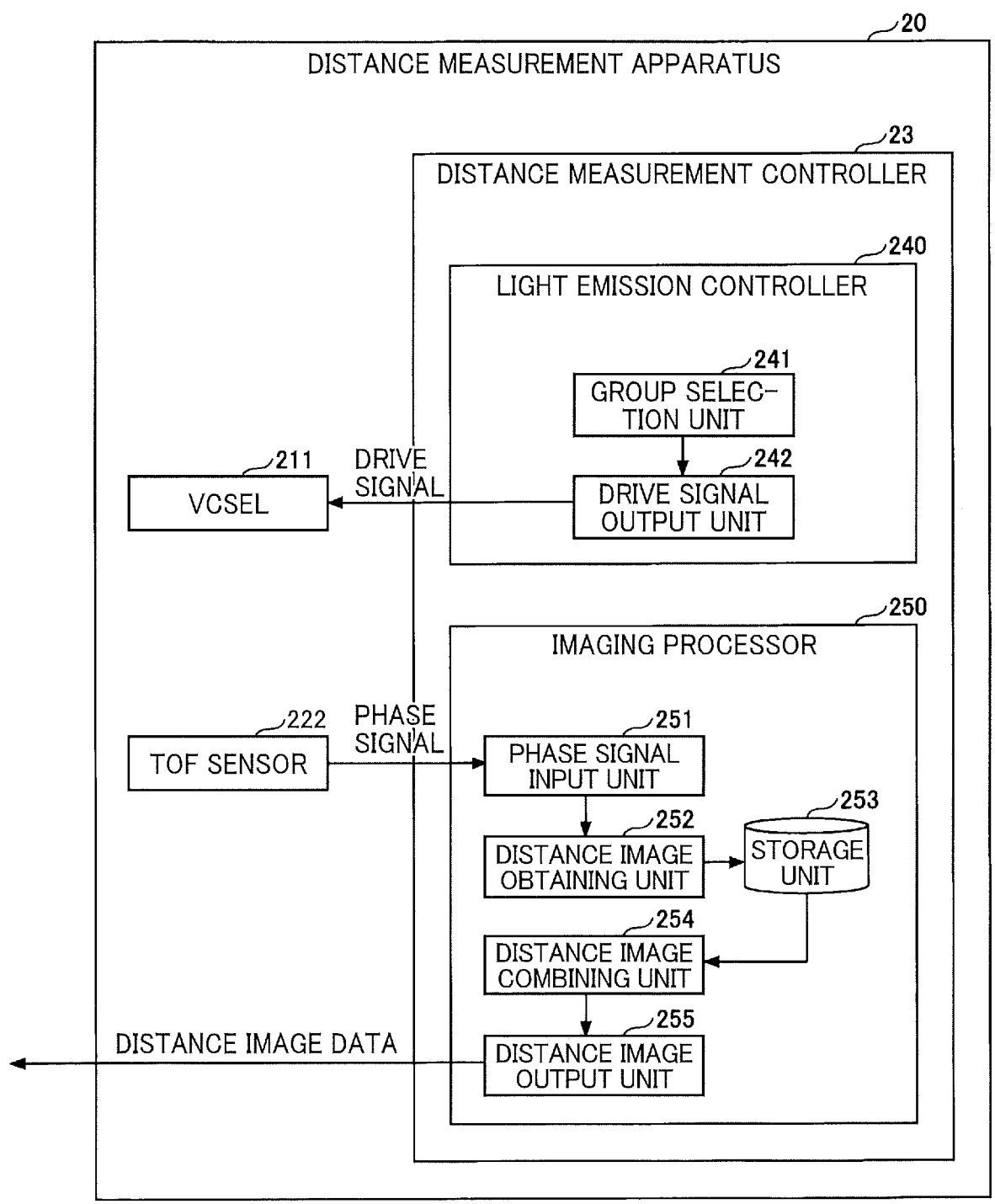
FIG. 5 is a block diagram illustrating an example functional configuration of the distance measurement controller according to the first embodiment.

Functional Configuration of Distance Measurement Controller According to First Embodiment FIG. 5 is a block diagram illustrating an example functional configuration of the distance measurement controller 23 according to this embodiment. As illustrated in FIG. 5, the distance measurement controller 23 includes a light emission controller 240 and an imaging processor 250.

The light emission controller 240 causes the plurality of light emitters included in the VCSEL 211 to emit light a plurality of times while shifting the positions of the light emitters. The light emission controller 240 includes a group selection unit 241 and a drive signal output unit 242.

The group selection unit 241, which is implemented by, for example, the CPU 231 executing a predetermined program, executes a process for selecting a predetermined group including one or more light emitters determined in advance from among the plurality of light emitters included in the VCSEL 211. The group selection unit 241 outputs a signal indicating the selected group to the drive signal output unit 242. The drive signal output unit 242 outputs a drive signal to the VCSEL 211 in accordance with the output signal, thereby allowing one or more light emitters included in the selected group to simultaneously emit light. A light emitter not included in the selected group does not emit light.

The plurality of light emitters included in the VCSEL 211 are each included in any group. The group selection unit 241 selects in chronological order a group of light emitters to be caused to emit light such that light emission for each group can be switched at every predetermined cycle. As an example, the plurality of light emitters included in the VCSEL 211 is divided into four groups. In this case, the group selection unit 241 sequentially selects the four groups in chronological order within one cycle. In response to the selection by the group selection unit 241, light emitters included in each group simultaneously emit light once such that light is emitted from the groups four times in total within one cycle. Specifically, this cycle is 33 milliseconds, for example. In the plurality of light emitters included in the VCSEL 211, the individual groups are complementary to each other. This ensures that all of the plurality of light emitters emit light once during one light-emission cycle. The spatial light emission patterns of the individual groups will be described in detail below with reference to FIGS. 6 to 10.

The drive signal output unit 242, which is implemented by the light source driving circuit 235 and the like, outputs a drive signal to the VCSEL 211 to cause light emitters in a group selected by the group selection unit 241 to simultaneously emit light. The drive signal output unit 242 outputs a drive signal with a predetermined voltage waveform and a predetermined light-emission frequency, thereby time-modulating (temporally controlling) light emission from the light emitters. In the embodiment, as an example, a drive signal of a rectangular wave or a sine wave with a frequency of the order of megahertz (MHz) is output to the VCSEL 211 at a predetermined timing.

In the light emission controller 240, accordingly, the group selection unit 241 selects a group, and one or more light emitters included in the selected group are caused to simultaneously emit light, thereby shifting the positions of the plurality of light emitters. In addition, light emitters are caused to emit light at every predetermined cycle, thereby allowing the light emitters to emit light a plurality of times.

The imaging processor 250 includes a phase signal input unit 251, a distance image obtaining unit 252, a storage unit 253, a distance image combining unit 254, and a distance image output unit 255.

The phase signal input unit 251, which is implemented by the sensor I/F 236 and the like, receives input of phase signals output from the TOF sensor 222. The phase signal input unit 251 can receive input of phase signals for each of the two-dimensionally arranged pixels of the TOF sensor 222. As described above, the plurality of light emitters included in the VCSEL 211 emit light in such a manner that the group selected by the group selection unit 241 is switched in chronological order. The phase signal input unit 251 receives input of phase signals corresponding to light emission from each group in chronological order. As an example, the phase signal input unit 251 receives input of phase signals in synchronization with light emission from each group. The phase signal input unit 251 outputs the input phase signals to the distance image obtaining unit 252.

The distance image obtaining unit 252, which is implemented by, for example, the CPU 231 executing a predetermined program, obtains distance image data indicating the distance from the distance measurement apparatus 20 to the target object on the basis of the phase signals for each of the pixels of the TOF sensor 222, which are input from the phase signal input unit 251. The term "distance image", as used herein, refers to an image generated by two-dimensionally arranging the respective pieces of distance data obtained for the pixels in accordance with the positions of the pixels. Examples of the distance image include an image generated by converting the respective distances to the luminance values of the pixels. The distance image obtaining unit 252 obtains distance image data for each group, which corresponds to light emission from the group, in chronological order and outputs the obtained distance image data to the storage unit 253.

The storage unit 253, which is implemented by the RAM 233 and the like, temporarily stores the distance image data input from the distance image obtaining unit 252.

The distance image combining unit 254, which is implemented by, for example, the CPU 231 executing a predetermined program, reads the respective pieces of distance image data for the groups, which are temporarily stored in the storage unit 253, and combines the pieces of distance image data to generate a single piece of distance image data.

As an example, the plurality of light emitters included in the VCSEL 211 is divided into four groups. In this case, four pieces of distance image data are obtained by simultaneous light emission on the group-by-group basis. The distance image combining unit 254 can combine the four pieces of distance image data to generate a single piece of distance image data. The method for combining pieces of distance image data will be described in detail below. The distance image combining unit 254 outputs the generated distance image data to the distance image output unit 255.

The distance image output unit 255, which is an example of a distance output unit, is implemented by the input/output I/F 237 and the like. The distance image output unit 255 outputs the distance image data input from the distance image combining unit 254 to an external device. The distance image data output from the distance image output unit 255 is an example of "distance data".

The distance measurement controller 23 is capable of synchronously controlling emission of light from the VCSEL 211 and reception of light by the TOF sensor 222. Distance measurement based on the TOF method may be performed using a known technique disclosed in JP-2018-77143-A, which will not be described in further detail herein.

Spatial Light Emission Control Using Distance Measurement Apparatus According to First Embodiment As described above, this embodiment uses the VCSEL 211 in which a plurality of light emitters are two-dimensionally arranged in the YZ plane. Accordingly, the light emission pattern of each light emitter in the YZ plane can be spatially controlled (changed). An example of spatial light emission control performed by the distance measurement apparatus 20 according to this embodiment will be described with reference to FIGS. 6 to 10.

Figure 6:
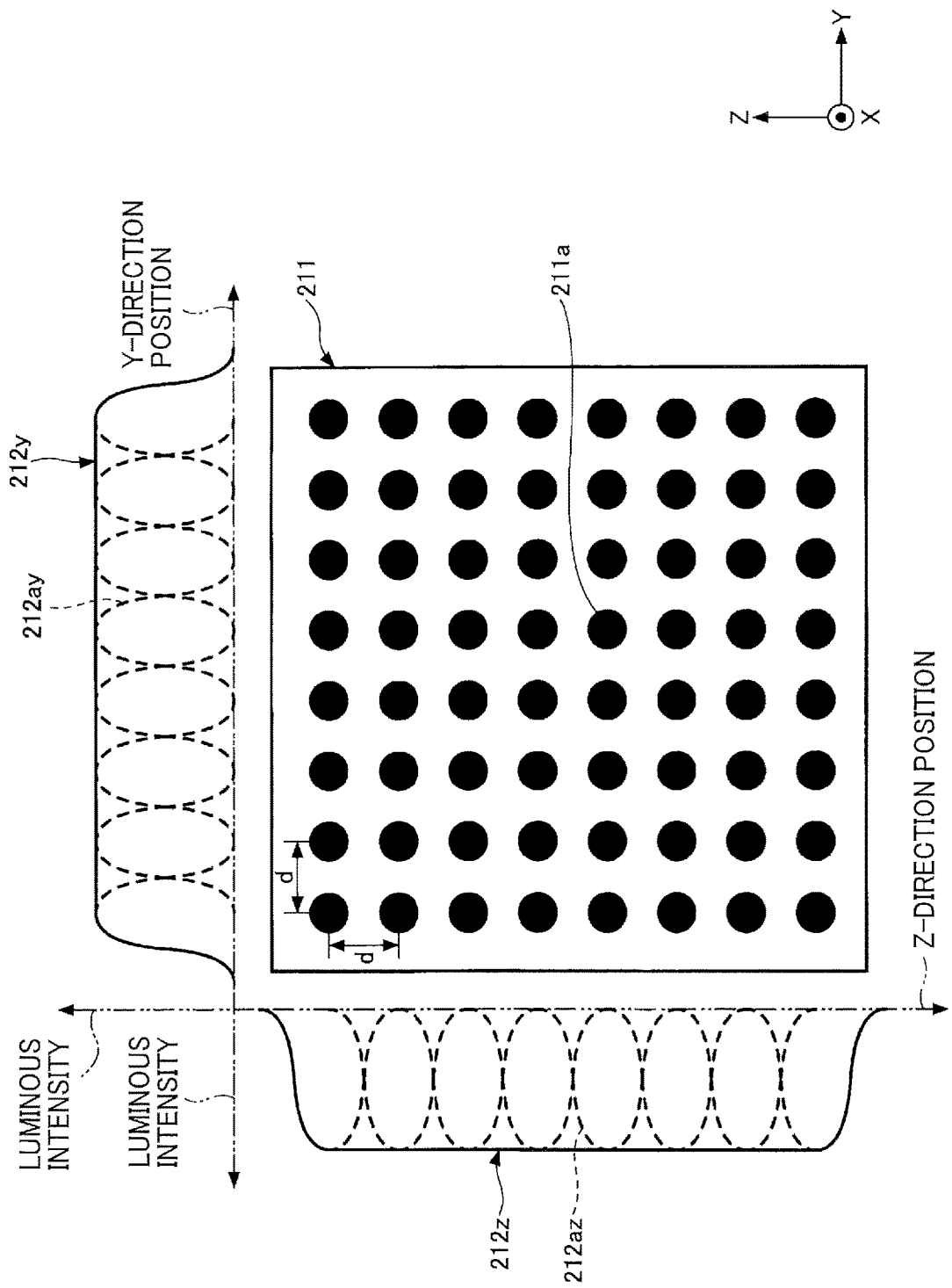
FIG. 6 illustrates a light emitting state in which all of the light emitters included in a vertical cavity surface emitting laser (VCSEL) are caused to emit light.

In FIGS. 6 to 10, first, referring to FIG. 6, a light emitting state in which all of the light emitters included in the VCSEL 211 are caused to emit light will be described as a comparative example. Then, referring to FIGS. 7 to 10, light emitting states obtained by switching a group of light emitters to be caused to emit light among the light emitters included in the VCSEL 211 will be described as an example of spatial light emission control according to this embodiment.

To avoid redundant description, first, parts common to FIGS. 6 to 10 will be described.

FIGS. 6 to 10 illustrate the light emitters of the VCSEL 211, as viewed from the positive Z direction (light projection direction). The VCSEL 211 includes eight columns of light emitters in the Y direction and eight rows of light emitters in the Z direction. Thus, the VCSEL 211 includes 64 light emitters 211a in total, which are two-dimensionally arranged in a square lattice within the YZ plane.

In FIGS. 6 to 10, light emitters 211a of the VCSEL 211 are depicted by black circles or white circles. When a light emitter 211a is depicted by a black circle, this indicates that the light emitter 211a emits light (turn-on state). When a light emitter 211a is depicted by a white circle, this indicates that the light emitter 211a does not emit light (turn-off state).

In FIGS. 6 to 10, furthermore, the horizontal axis indicated by a one-dot chain line (the axis with the rightward arrow) represents the positions of the light emitters of the VCSEL 211 in the Y direction, and the vertical axis indicated by a one-dot chain line (the axis with the downward arrow) represents the positions of the light emitters of the VCSEL 211 in the Z direction. The horizontal axis indicated by a two-dot chain line (the axis with the leftward arrow) represents the luminous intensities (illumination distributions) of light projected from the light projector 21 in the Z direction, and the vertical axis indicated by a two-dot chain line (the axis with the upward arrow) represents the luminous intensities (illumination distributions) of light projected from the light projector 21 in the Y direction.

FIG. 6 illustrates a light emitting state in which all of the light emitters included in the VCSEL 211 are caused to emit light.

In the illumination distributions in the Y direction, an illumination distribution 212ay indicated by a broken line represents an illumination distribution of light emitted from each of the light emitters 211a, and an illumination distribution 212y indicated by a solid line represents an illumination distribution of overlapped light from the light emitters 211a. As illustrated in FIG. 6, as a result of emission of light from all of the light emitters 211a in the Y direction, a substantially uniform illumination distribution is obtained in the Y direction.

Likewise, in the illumination distribution in the Z direction, an illumination distribution 212az indicated by a broken line represents an illumination distribution of light emitted from each of the light emitters 211a, and an illumination distribution 212z indicated by a solid line represents an illumination distribution of overlapped light from the light emitters 211a. As illustrated in FIG. 6, as a result of emission of light from all of the light emitters 211a in the Z direction, a substantially uniform illumination distribution is obtained also in the Z direction.

In other words, the interval between the light emitters 211a in the Y direction and the Z direction is determined so that a substantially uniform illumination distribution can be obtained in the Y direction and the Z direction when all of the light emitters 211a included in the VCSEL 211 emit light. The interval between the light emitters 211a to obtain such a substantially uniform illumination distribution is 50 µm, for example. In this embodiment, the interval between the light emitters 211a in the Y direction and the Z direction is denoted by d.

Figure 7:
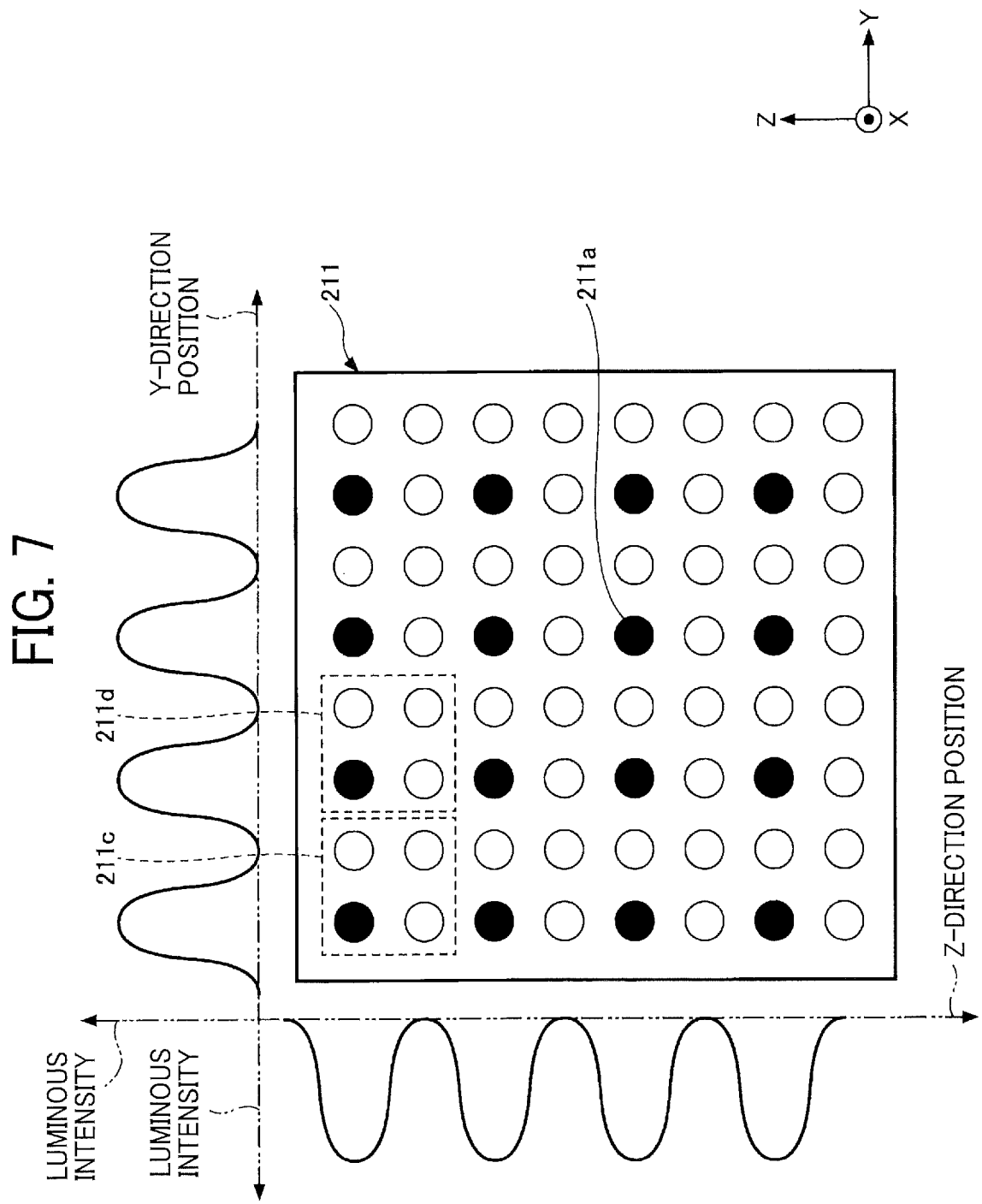
FIG. 7 illustrates a light emitting state of pattern A when light emitters in a first group are caused to emit light.

FIG. 7 illustrates a light emitting state of pattern A when light emitters in a first group are caused to emit light. In a set 211c of four light emitters enclosed by a broken-line box, only the upper left light emitter emits light while the remaining three light emitters do not emit light. Likewise, also in an adjacent set 211d of four light emitters, only the upper left light emitter emits light while the remaining three light emitters do not emit light.

In this way, when each set is formed by four light emitters, the state in which only the upper left light emitter in each set is caused to emit light is referred to as the light emitting state of the pattern A. A group of light emitters to be caused to emit light with the pattern A is referred to as a first group. In FIG. 7, light emitters depicted by black circles are the light emitters included in the first group.

Figure 8:
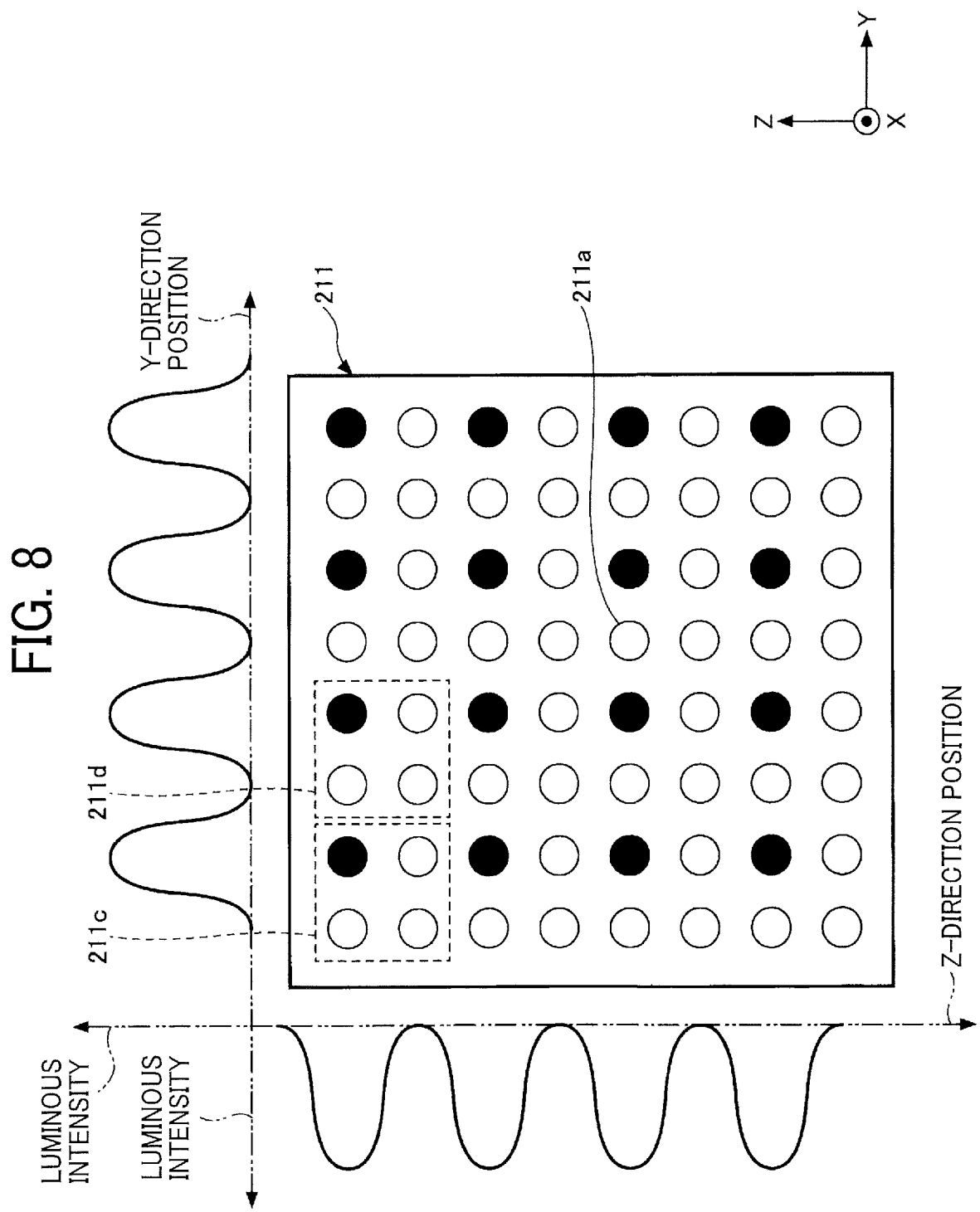
FIG. 8 illustrates a light emitting state of pattern B when light emitters in a second group are caused to emit light.

FIG. 8 illustrates a light emitting state of pattern B when light emitters in a second group are caused to emit light. In the set 211c of four light emitters, only the upper right light emitter emits light while the remaining three light emitters do not emit light. Likewise, also in the adjacent set 211d of four light emitters, only the upper right light emitter emits light while the remaining three light emitters do not emit light.

In this way, when each set is formed by four light emitters, the state in which only the upper right light emitter in each set is caused to emit light is referred to as the light emitting state of the pattern B. A group of light emitters to be caused to emit light with the pattern B is referred to as a second group. In FIG. 8, light emitters depicted by black circles are the light emitters included in the second group.

Figure 9:
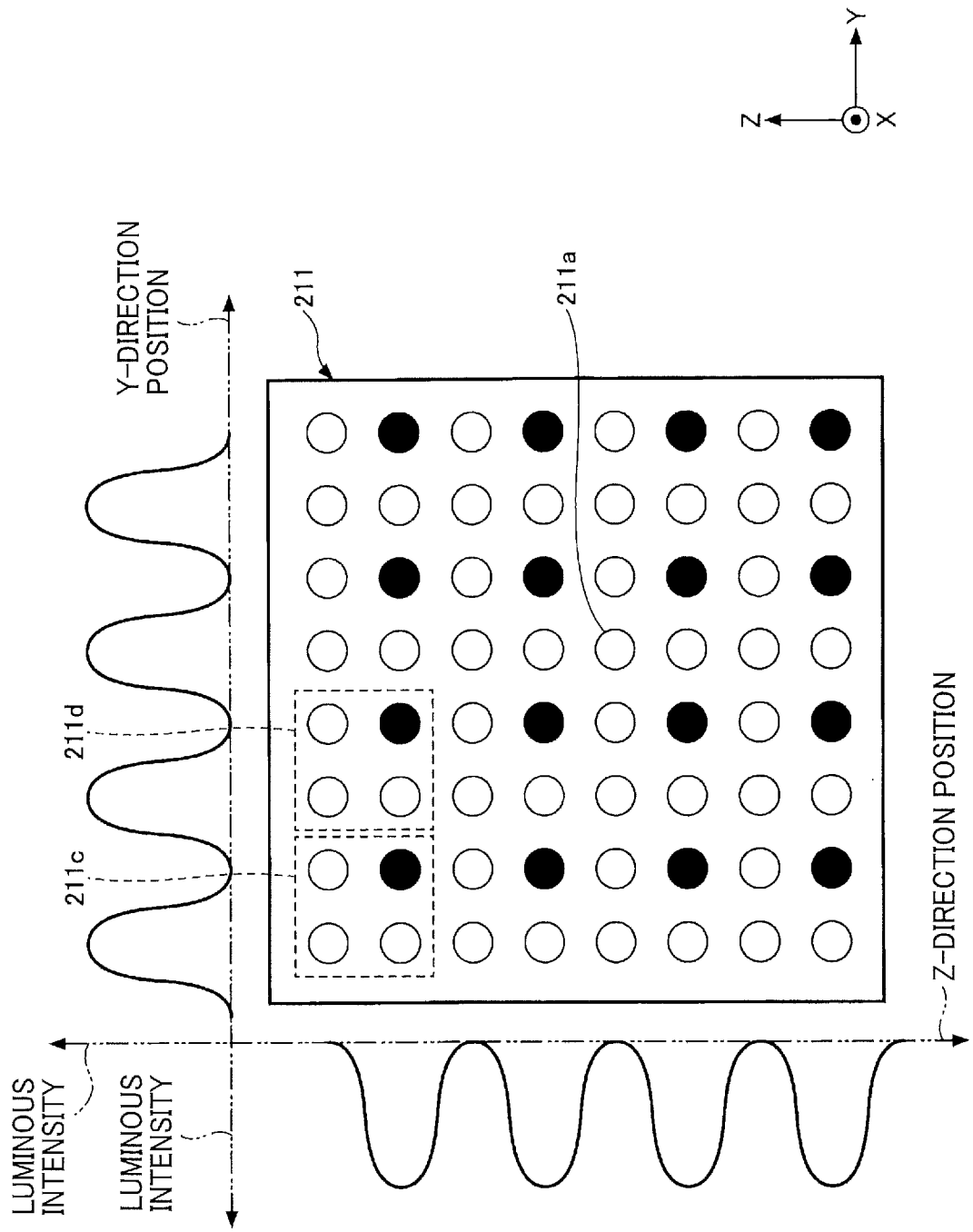
FIG. 9 illustrates a light emitting state of pattern C when light emitters in a third group are caused to emit light.

FIG. 9 illustrates a light emitting state of pattern C when light emitters in a third group are caused to emit light. In the set 211c of four light emitters, only the lower right light emitter emits light while the remaining three light emitters do not emit light. Likewise, also in the adjacent set 211d of four light emitters, only the lower right light emitter emits light while the remaining three light emitters do not emit light.

In this way, when each set is formed by four light emitters, the state in which only the lower right light emitter in each set is caused to emit light is referred to as the light emitting state of the pattern C. A group of light emitters to be caused to emit light with the pattern C is referred to as a third group. In FIG. 9, light emitters depicted by black circles are the light emitters included in the third group.

Figure 10:
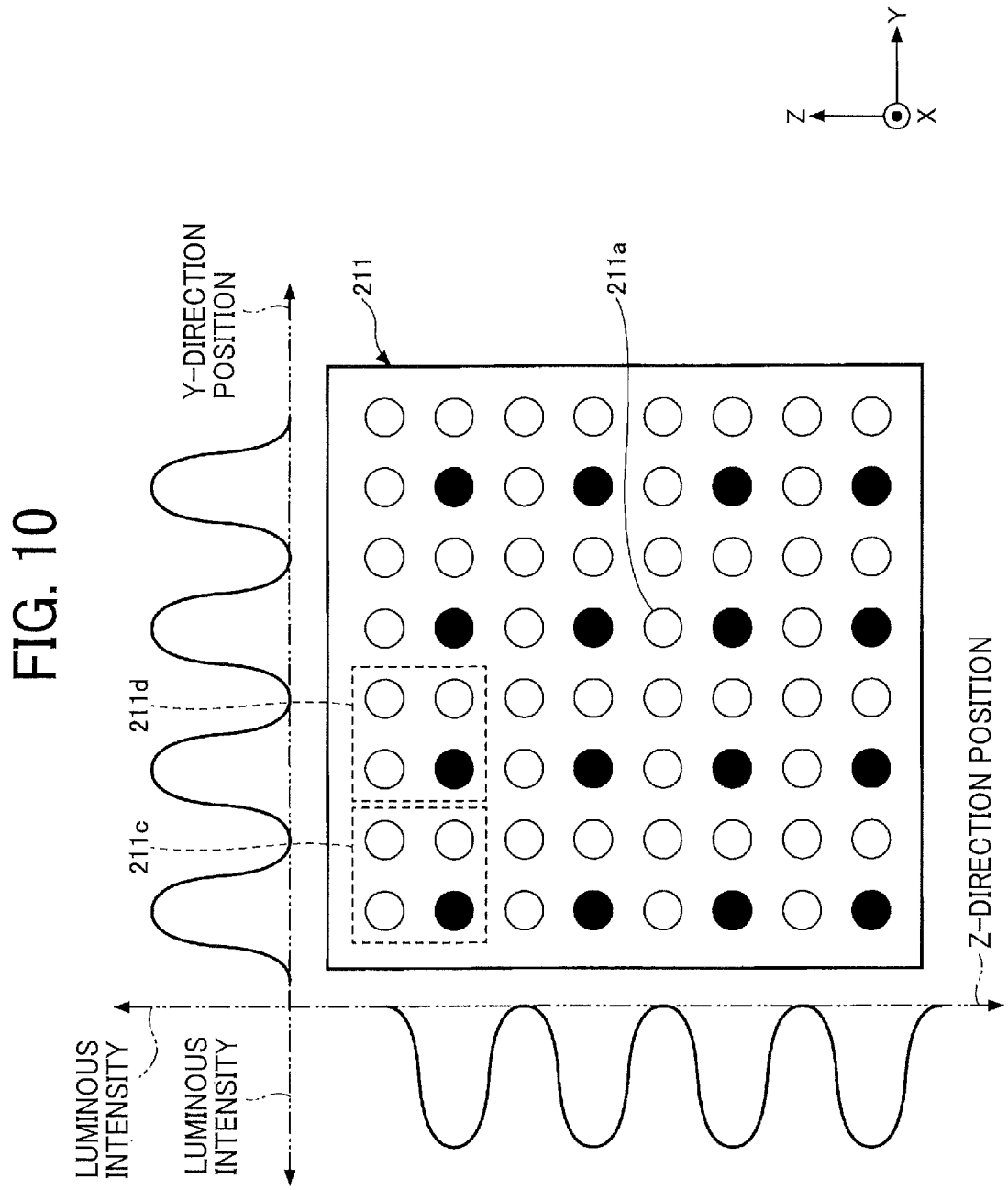
FIG. 10 illustrates a light emitting state of pattern D when light emitters in a fourth group are caused to emit light.

FIG. 10 illustrates a light emitting state of pattern D when light emitters in a fourth group are caused to emit light. In the set 211c of four light emitters, only the lower left light emitter emits light while the remaining three light emitters do not emit light. Likewise, also in the adjacent set 211d of four light emitters, only the lower left light emitter emits light while the remaining three light emitters do not emit light.

In this way, when each set is formed by four light emitters, the state in which only the lower left light emitter in each set is caused to emit light is referred to as the light emitting state of the pattern D. A group of light emitters to be caused to emit light with the pattern D is referred to as a fourth group. In FIG. 10, light emitters depicted by black circles are the light emitters included in the fourth group.

As illustrated in FIGS. 7 to 10, the group selection unit 241 of the distance measurement apparatus 20 divides the plurality of light emitters included in the VCSEL 211 into four groups, namely, the first to fourth groups, each including one or more light emitters, such that light emitters in each group are caused to simultaneously emit light. The first to fourth groups are an example of groups each including one or more light emitters. Causing light emitters included in each group to simultaneously emit light is an example of "causing at least some of a plurality of light emitters to simultaneously emit light".

The period during which the pattern A, the pattern B, the pattern C, and the pattern D illustrated in FIGS. 7 to 10 are used until the pattern A is used again corresponds to one cycle of shifting the positions of the plurality of light emitters. The distance measurement apparatus 20 drives the VCSEL 211 to emit light to project light while repeating this cycle.

In the light emitting state of each of the patterns A to D, only some light emitters among the light emitters included in the VCSEL 211 emit light. The light emitters are caused to emit light with the patterns A to D being sequentially switched, thereby allowing all of the light emitters included in the VCSEL 211 to emit light once within one cycle.

When all of the light emitters included in the VCSEL 211 are caused to simultaneously emit light, the VCSEL 211 generates heat. The generated heat may result in a reduction in the amount of light emitted from each of the light emitters of the VCSEL 211. When a single light emitter is caused to continuously emit light, the VCSEL 211 is also likely to generate heat, which may result in a reduction in the amount of light emitted from each of the light emitters of the VCSEL 211.

In this embodiment, in contrast, instead of causing all of the light emitters included in the VCSEL 211 to simultaneously emit light, the group selection unit 241 divides the light emitters into four groups, namely, the first to fourth groups, and performs control to select (switch) the group to be caused to emit light in chronological order.

This operation can increase the spatial interval between the light emitters to be caused to emit light during a single light projection event and can suppress generation of heat that is intensively generated when the spatial interval between light emitters is small. In addition, causing each light emitter to intermittently emit light can suppress heat generation from the VCSEL 211 due to continuous light emission. Suppressing heat generation from the VCSEL 211 can prevent the reduction in the amount of light emitted from each light emitter.

Since light emission from each group corresponds to light emission from some light emitters among the plurality of light emitters, as illustrated in FIGS. 7 to 10, portions where light emitters emit light have high luminous intensity while portions where light emitters do not emit light have low luminous intensity. Accordingly, in pieces of distance image data obtained through light emission from the respective groups, in a region where the luminous intensity of projected light is high within the area to be imaged, reflected light from the target object has high light intensity, resulting in the distance being detected with sufficient accuracy. In a region with low luminous intensity, however, reflected light from the target object has low light intensity, and the distance may be difficult to detect with sufficient accuracy.

To address this situation, in this embodiment, the group of light emitters to be caused to simultaneously emit light is switched at every predetermined cycle such that each of the plurality of light emitters is caused to emit light once within one cycle. Accordingly, the respective light emissions of the first to fourth groups are performed in a complementary fashion.

Accordingly, even in a region where the distance is difficult to detect with sufficient accuracy since the luminous intensity is low because light emitters do not emit light during light emission from a predetermined group within the area to be imaged, any other group emits light such that the light emitters corresponding to this region emit light, and accordingly the distance is detected with sufficient accuracy. The distance image combining unit 254 (FIG. 5) joins together regions in which the distances are detected with sufficient accuracy by using four pieces of distance image data that are complementary to each other to generate a single composite piece of distance image data. This makes it possible to detect the distance with sufficient accuracy in the entire area of the distance image data.

In other words, light emission from four groups in a complementary fashion is switched in chronological order such that light is projected four times. This suppresses heat generation from the VCSEL 211 and enables obtaining of distance image data with distance detection accuracy equivalent to that obtained when all of the light emitters included in the VCSEL 211 are caused to emit light (see FIG. 6).

Distance Image Data Obtaining Process by Distance Measurement Apparatus According to First Embodiment This embodiment provides temporal light emission control of the VCSEL 211 in addition to the spatial light emission control described above. Since the temporal light emission control of the VCSEL 211 is related to the light-receiving timing of the TOF sensor 222, a distance image data obtaining process performed by the distance measurement apparatus 20 will be described first prior to the description of the temporal light emission control of the VCSEL 211.

The TOF sensor 222 includes, for each pixel, two electric charge accumulators, namely, a first electric charge accumulator and a second electric charge accumulator, and is capable of quickly switching the electric charge accumulator to which an electric charge is to be accumulated. Thus, two opposite phase signals are simultaneously detectable for a single rectangular wave. As an example, a set of phase signals of 0 degrees and 180 degrees or a set of phase signals of 90 degrees and 270 degrees are simultaneously detectable. That is, the light projection and light reception process is performed twice to obtain a distance.

Figure 11:
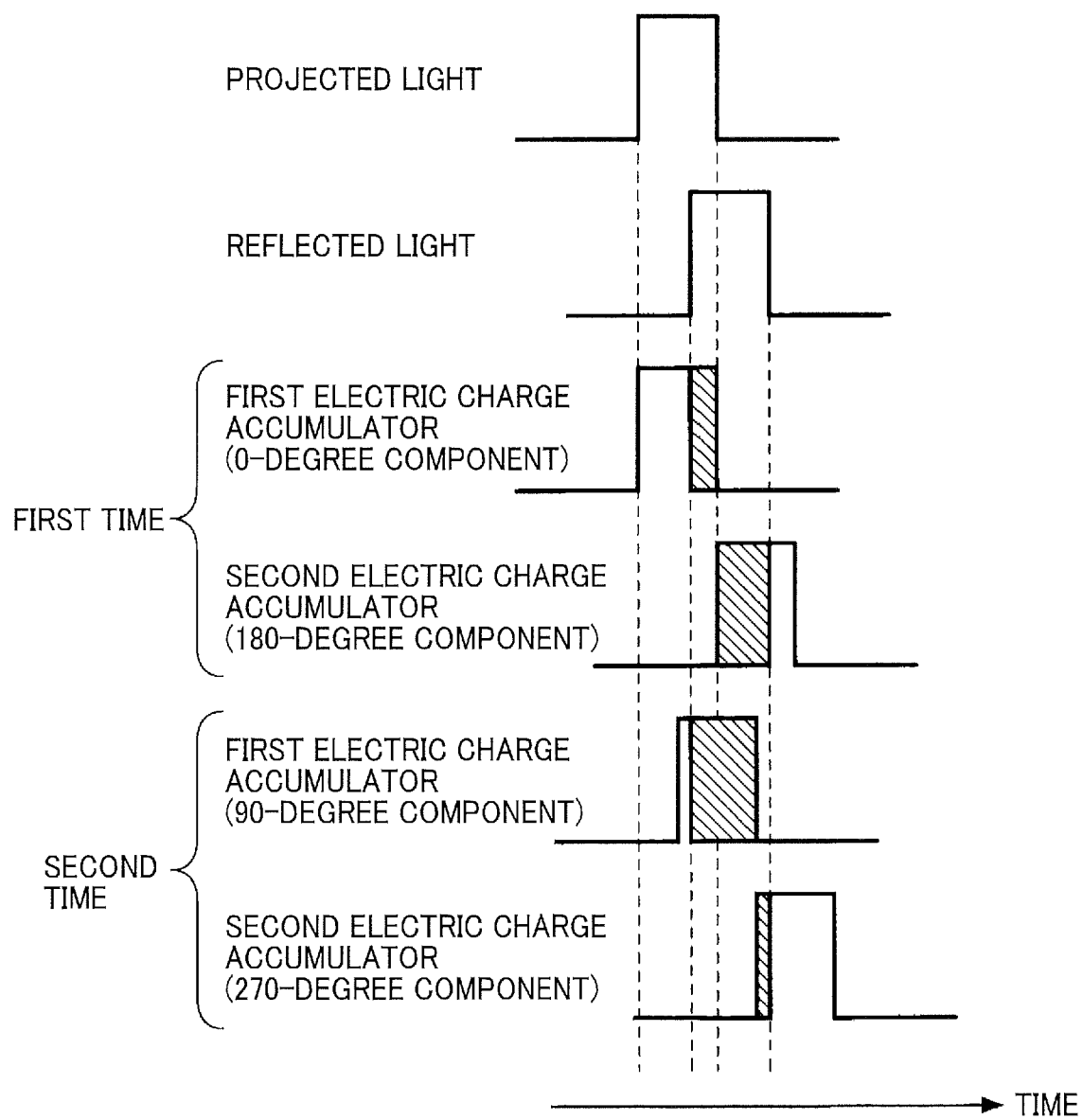
FIG. 11 illustrates the principle of obtaining distance data using a TOF sensor.

FIG. 11 illustrates the principle of obtaining distance data using the TOF sensor 222. In FIG. 11, the timings of accumulation of an electric charge in the first electric charge accumulator and the second electric charge accumulator for projected light and its reflected light from the target object are illustrated. An amount of electric charge corresponding to shaded portions is accumulated.

In actuality, to increase the amount of electric charge to be accumulated for each of the pixels of the TOF sensor 222, light is not projected by a single application of a rectangular wave (pulse laser light), but is projected by repeated applications of pulse laser light modulated by a rectangular wave with a duty ratio of 50%. In response to projection of pulse laser light, the first electric charge accumulator and the second electric charge accumulator are repeatedly switched.

For example, four phase signals $A_0(y,z)$, $A_{90}(y,z)$, $A_{180}(y,z)$, and $A_{270}(y,z)$ obtained in the light emitting state of the pattern A are phase signals of four temporally divided phases of 0 degrees, 90 degrees, 180 degrees, and 270 degrees, respectively, with respect to the light emission cycle (light-emission frequency) of projected light. The distance image obtaining unit 252 illustrated in FIG. 5 is capable of obtaining a phase difference angle $\phi(y,z)$ in accordance with the equation below using the four phase signals $A_0(y,z)$, $A_{90}(y,z)$, $A_{180}(y,z)$, and $A_{270}(y,z)$ input from the phase signal input unit 251.

In the equation, (y,z) denotes coordinates in the YZ plane. For example, the phase signal $A_0(y,z)$ represents a phase signal $A_0$ at a pixel identified by coordinates (y,z). The same applies to the phase difference angle $\phi(y,z)$ and the like.

$$\phi(y,z) = \operatorname{Arctan}[\{A_{90}(y,z) - A_{270}(y,z)\} / \{A_0(y,z) - A_{180}(y,z)\}]$$

Further, the distance image obtaining unit 252 is capable of obtaining a delay time $Td(y,z)$ in accordance with the equation below using the phase difference angle $\phi(y,z)$.

$$Td(y,z) = \phi(y,z) / 2\pi \times T,$$

where T denotes the light emission width (pulse width) of projected light.

The distance image obtaining unit 252 is also capable of obtaining data $e(y,z)$ indicating the distance to the target object in accordance with the equation below using the delay time $Td(y,z)$.

$$d(y,z) = Td(y,z) \times c \div 2,$$

where c denotes the velocity of light.

The process described above is executed for each of the pixels of the TOF sensor 222 to obtain distance image data. The obtained distance image data is output to an external device via the distance image output unit 255 illustrated in FIG. 5.

The distance data obtaining process using phase signals output from the TOF sensor 222 may be performed using a known technique disclosed in JP-2018-77143-A, for example, and will not be described in further detail herein.

Temporal Light Emission Control by Distance Measurement Apparatus According to First Embodiment Next, an example of the temporal light emission control performed by the distance measurement apparatus 20 according to this embodiment will be described with reference to FIG. 12 and FIG. 13. As described above with reference to FIG. 11, to increase the amount of electric charge to be accumulated for each of the pixels of the TOF sensor 222, light is not projected by a single application of pulse laser light, but is projected by repeated applications of pulse laser light modulated by a rectangular wave with a duty ratio of 50%. In response to projection of pulse laser light, the first electric charge accumulator and the second electric charge accumulator are repeatedly switched.

Figure 12:
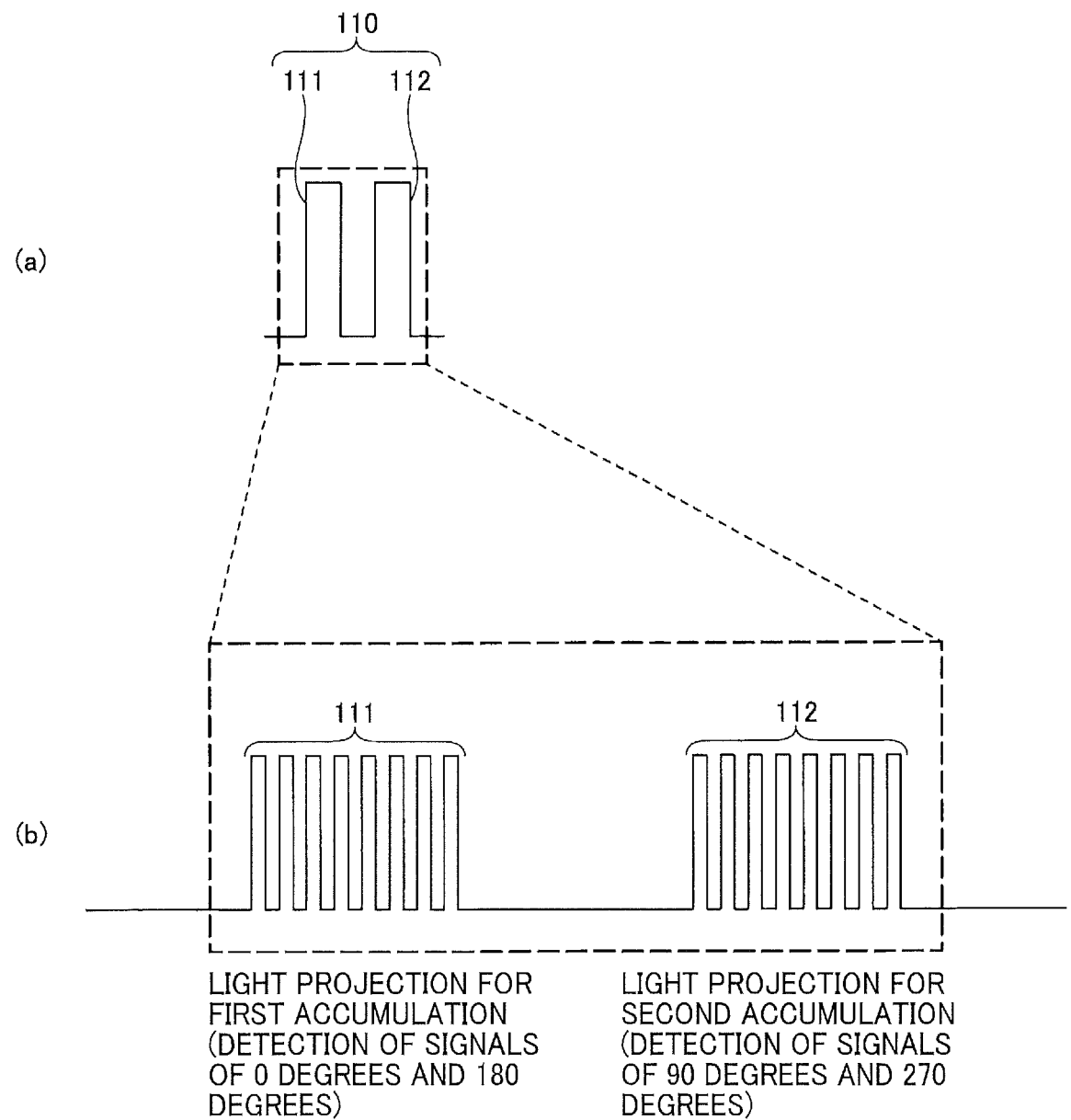
FIG. 12 illustrates an example of temporal light emission control according to the first embodiment, in which (a) of FIG. 12 illustrates an overview of a light emission timing, and (b) of FIG. 12 illustrates the details of the light emission timing.

FIG. 12 illustrates an example of temporal light emission control according to this embodiment. FIG. 12(a) illustrates an overview of a light emission timing, and FIG. 12(b) illustrates the details of the light emission timing. In FIG. 12, the horizontal axis represents time, and the vertical axis represents the amount of light.

The projected pulse laser light is emitted in accordance with a rectangular wave with a duty ratio of 50%. As described above, in response to projection of pulse laser light twice, the TOF sensor 222 receives light twice and detects and outputs a set of two phase signals of 0 degrees and 180 degrees and a set of two phase signals of 90 degrees and 270 degrees. Since distance data is obtained on the basis of the sets of two phase signals, pulse laser light projected twice is referred to as "distance-data-obtaining reference projected light".

In FIG. 12(a), pulse laser light 111 allows the TOF sensor 222 to detect phase signals of 0 degrees and 180 degrees. Pulse laser light 112 allows the TOF sensor 222 to detect phase signals of 90 degrees and 270 degrees. A pulse laser light set 110 including the pulse laser light 111 and the pulse laser light 112 corresponds to "distance-data-obtaining reference projected light".

As illustrated in FIG. 12(b), the pulse laser light 111 includes a pulse laser light group constituted by eight pulse laser beams of light that are modulated by a rectangular wave with a duty ratio of 50%. To detect phase signals of 0 degrees and 180 degrees, the TOF sensor 222 receives the pulse laser light group, thereby increasing the amount of electric charge to be accumulated.

Likewise, the pulse laser light 112 includes a pulse laser light group constituted by eight pulse laser beams of light that are modulated by a rectangular wave with a duty ratio of 50%. To detect phase signals of 90 degrees and 270 degrees, the TOF sensor 222 receives the pulse laser light group, thereby increasing the amount of electric charge to be accumulated.

By way of example, but not limitation, each of the pulse laser light 111 and the pulse laser light 112 includes a group of eight pulse laser beams of light. Each pulse laser light group may include more or fewer pulse laser beams of light.

Figure 13:
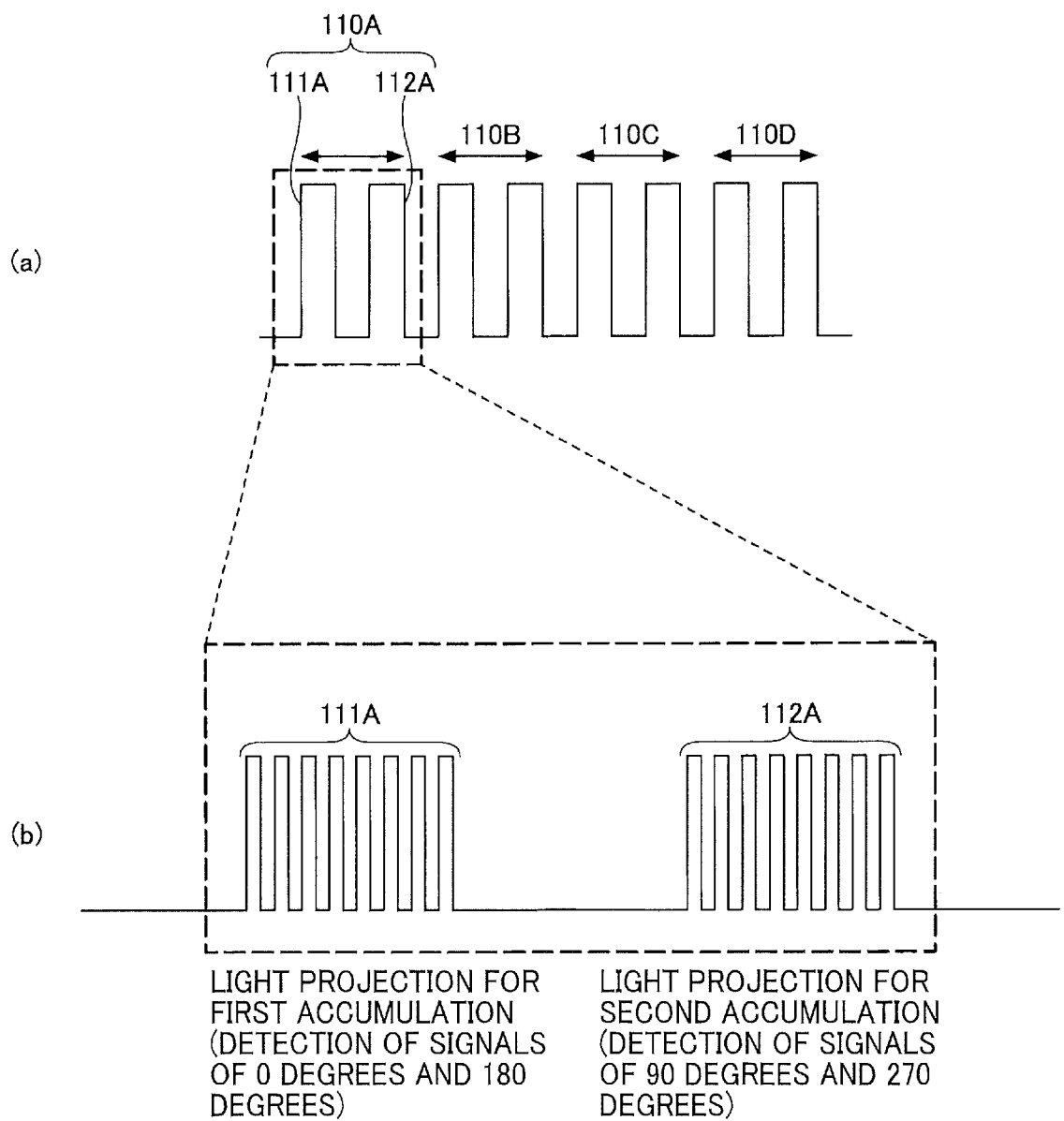
FIG. 13 illustrates an example of temporal light emission control for each group of light emitters according to the first embodiment, in which (a) of FIG. 13 illustrates an overview of a light emission timing, and (b) of FIG. 13 illustrates the details of the light emission timing.

FIG. 13 illustrates an example of temporal light emission control for each group of light emitters according to this embodiment. FIG. 13(a) illustrates an overview of a light emission timing, and FIG. 13(b) illustrates the details of the light emission timing. In FIG. 13, as in FIG. 12, the horizontal axis represents time, and the vertical axis represents the amount of light.

In FIG. 13(a), a pulse laser light set 110A indicates projection of light with the pattern A by the light emitters in the first group, and a pulse laser light set 110B indicates projection of light with the pattern B by the light emitters in the second group. A pulse laser light set 110C indicates projection of light with the pattern C by the light emitters in the third group, and a pulse laser light set 110D indicates projection of light with the pattern D by the light emitters in the fourth group. Each of the pulse laser light sets 110A to 110D corresponds to "distance-data-obtaining reference projected light".

As described above, "distance-data-obtaining reference projected light" is emitted using each of the patterns A to D, with the patterns A to D being switched in chronological order. Accordingly, distance data can be obtained for each of the patterns A to D in accordance with phase signals output from the TOF sensor 222.

As illustrated in FIG. 13(b), a pulse laser light 111A includes a pulse laser light group constituted by eight pulse laser beams of light that are modulated by a rectangular wave with a duty ratio of 50%. To detect phase signals of 0 degrees and 180 degrees, the TOF sensor 222 receives the pulse laser light group, thereby increasing the amount of electric charge to be accumulated.

Likewise, a pulse laser light 112A includes a pulse laser light group constituted by eight pulse laser beams of light that are modulated by a rectangular wave with a duty ratio of 50%. To detect phase signals of 90 degrees and 270 degrees, the TOF sensor 222 receives the pulse laser light group, thereby increasing the amount of electric charge to be accumulated.

By way of example, but not limitation, each of the pulse laser light 111A and the pulse laser light 112A includes a group of eight pulse laser beams of light. Each pulse laser light group may include more or fewer pulse laser beams of light. The patterns B to D are similar to the pattern A, and will not be described repeatedly.

Operation of Distance Measurement Apparatus According to First Embodiment

Figure 14:
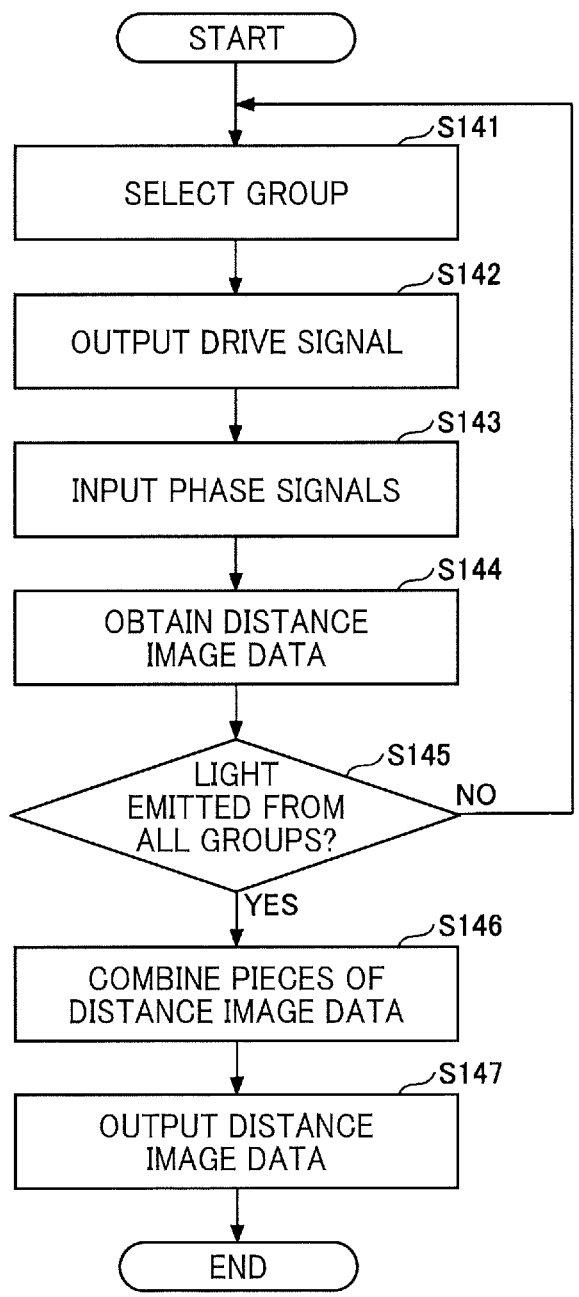
FIG. 14 is a flowchart illustrating an example of the operation of the distance measurement apparatus according to the first embodiment.

Next, the operation of the distance measurement apparatus 20 will be described with reference to FIG. 14. FIG. 14 is a flowchart illustrating an example of the operation of the distance measurement apparatus 20 according to this embodiment. In FIG. 14, the plurality of light emitters included in the VCSEL 211 are divided into a first group, a second group, a third group, and a fourth group. By way of example, the light emitters in the first group are caused to emit light using the pattern A, the light emitters in the second group are caused to emit light using the pattern B, the light emitters in the third group are caused to emit light using the pattern C, and the light emitters in the fourth group are caused to emit light using the pattern D.

First, in step S141, the group selection unit 241 selects the first group and outputs a signal indicating the first group to the drive signal output unit 242.

Then, in step S142, the drive signal output unit 242 outputs a drive signal to the VCSEL 211 to cause the light emitters in the first group selected by the group selection unit 241 to simultaneously emit light. The drive signal output unit 242 outputs the drive signal with a predetermined voltage waveform and a predetermined light-emission frequency, thereby time-modulating (temporally controlling) light emission from the light emitters. As an example, a drive signal of a rectangular wave or a sine wave with a frequency of the order of megahertz (MHz) is output to the VCSEL 211 at a predetermined timing.

Then, in step S143, the phase signal input unit 251 receives input of phase signals corresponding to light emission from the first group, which are output from the TOF sensor 222, and outputs the input phase signals to the distance image obtaining unit 252.

Then, in step S144, the distance image obtaining unit 252 obtains distance image data indicating the distance from the distance measurement apparatus 20 to the target object in response to light emission from the first group in accordance with the phase signals for each of the pixels of the TOF sensor 222, which are input from the phase signal input unit 251. Then, the distance image obtaining unit 252 outputs the obtained distance image data to the storage unit 253. The storage unit 253 temporarily stores the distance image data input from the distance image obtaining unit 252.

Then, in step S145, the light emission controller 240 determines whether all of the first to fourth groups have emitted light. In other words, it is determined whether light has been emitted with all the light emission patterns of the patterns A to D.

If it is determined in step S145 that not all of the groups have emitted light (step S145, No), the process returns to step S141. The group selection unit 241 selects the second group to be caused to emit light with the pattern B, and outputs a signal indicating the second group to the drive signal output unit 242. Accordingly, the processing of steps S141 to S145 is repeated until all of the first to fourth groups determined in advance have been selected and have emitted light.

If it is determined in step S145 that all of the groups have emitted light (step S145, Yes), then in step S146, the distance image combining unit 254 reads four pieces of distance image data temporarily stored in the storage unit 253 and combines the four pieces of distance image data to generate a single piece of distance image data. Then, the distance image combining unit 254 outputs the generated distance image data to the distance image output unit 255.

Then, in step S147, the distance image output unit 255 outputs the distance image data, which is input from the distance image combining unit 254, to the outside of the distance measurement apparatus 20.

In the way described above, the distance measurement apparatus 20 can obtain distance image data and output the distance image data to the outside of the distance measurement apparatus 20.

An example of the processing method described above in step S146 for combining four pieces of distance image data to generate a single piece of distance image data will now be described. In the embodiment, pieces of distance image data are combined on the basis of the light intensities of light reflected from the target object in response to emission of light from the first to fourth groups. The light intensity $I(y,z)$ of light reflected from the target object for each pixel can be obtained in accordance with the equation below using the phase signals $A_0(y,z)$, $A_{90}(y,z)$, $A_{180}(y,z)$, and $A_{270}(y,z)$ output from the TOF sensor 222 for each pixel.

$$I(y,z)=\sqrt{[\{A_{90}(y,z)-A_{270}(y,z)\}^2+\{A_0(y,z)-A_{180}(y,z)\}^2]}$$

As the light intensity $I(y,z)$ of reflected light increases, the accuracy of distance image data obtained on the basis of the output of the TOF sensor 222 increases.

Given that the light intensities of reflected light obtained by the respective light emissions of the first to fourth groups are $I_1(y,z)$, $I_2(y,z)$, $I_3(y,z)$, and $I_4(y,z)$, respectively, the highest one of the light intensities $I_1(y,z)$, $I_2(y,z)$, $I_3(y,z)$, and $I_4(y,z)$ is selected for each pixel and the corresponding distance image data is used. Accordingly, the most accurate distance image data can be obtained.

For example, when the light intensity $I_3(y,z)$ is the highest at the pixel identified by coordinates $(y,z)$, distance image data obtained by light emission from the third group is used as the distance image data for the point at the coordinates $(y,z)$.

It should be noted that the processing method for combining four pieces of distance image data is not limited to that described above. Alternatively, four pieces of distance image data may be multiplied by weights corresponding to the magnitudes of four light intensities for each pixel and then added together to obtain distance data for each pixel, and pieces of distance data for the individual pixels may be combined to obtain distance image data.

Advantageous Effects

In a related-art distance measurement apparatus based on the TOF method, when light is projected to a wide area to be imaged, due to diffusion of light, the amount of light per unit solid angle reduces. This may make it difficult to measure a long distance. Further, a distance measurement apparatus is disclosed that sequentially obtains pieces of distance data across small areas while mechanically scanning light to be projected over the area to be imaged and that combines the pieces of distance data to obtain distance data across the large entire area to be imaged. However, due to scanning of light, it takes time to obtain distance data across the entire area to be imaged, and the distance measurement apparatus may move during the operation. Thus, a distance detection error may occur.

In this embodiment, a plurality of light emitters that are arranged two-dimensionally are used to project light toward a wide area to be imaged by using a fish-eye lens or a wide-angle lens. A plurality of light emitters, each of which projects light to a small area, are arranged two-dimensionally and project light. This configuration enables light to be projected toward a wide area to be imaged without mechanically scanning light. Pieces of distance data obtained across small areas are combined to obtain distance data across the wide area to be imaged. Therefore, it is possible to provide a distance measurement apparatus that readily obtains distance data.

In addition, the plurality of light emitters are divided into a plurality of groups, and the group of light emitters to be caused to emit light is switched in chronological order to obtain distance data. This configuration can suppress heat generation from the plurality of light emitters, compared to when all of the light emitters are caused to simultaneously emit light. Therefore, it is possible to prevent the reduction in the amount of light from the light emitters due to heat generation from the light emitters and to obtain accurate distance data.

In this embodiment, furthermore, the group of light emitters to be caused to simultaneously emit light is switched at every predetermined cycle such that each of the plurality of light emitters is caused to emit light once within one cycle. Accordingly, the respective light emissions of the first to fourth groups are performed in a complementary fashion. The distance image combining unit 254 joins together regions in which the distances are detected with sufficient accuracy by using four pieces of distance image data that are complementary to each other to generate a single composite piece of distance image data. This suppresses heat generation from the VCSEL 211 and enables distance image data to be obtained with distance detection accuracy equivalent to that when all of the light emitters included in the VCSEL 211 are caused to emit light.

In this embodiment, as a non-limiting example, the VCSEL 211 is used as a light source. Devices capable of emitting light, such as a plurality of laser diodes (LDs) (or semiconductor laser) that emit laser light or light emitting diodes (LEDs) that emit noncoherent light, may be two-dimensionally arranged in a plane to form a light source.

In this embodiment, furthermore, the plurality of light emitters included in the VCSEL 211 is divided into four groups, and the light emitters are caused to emit light with four light emission patterns, by way of example. The plurality of light emitters may be caused to emit light in a different way. The number of groups may be changed, and the number of light emission patterns may be changed in accordance with the number of groups. The following describes an example modification.

Modification

A distance measurement apparatus 20a according to a modification of the embodiment will be described with reference to FIGS. 15 and 16. In the distance measurement apparatus 20a, the plurality of light emitters included in the VCSEL 211 is divided into two groups such that the light emitters are caused to emit light with two light emission patterns.

Figure 15:
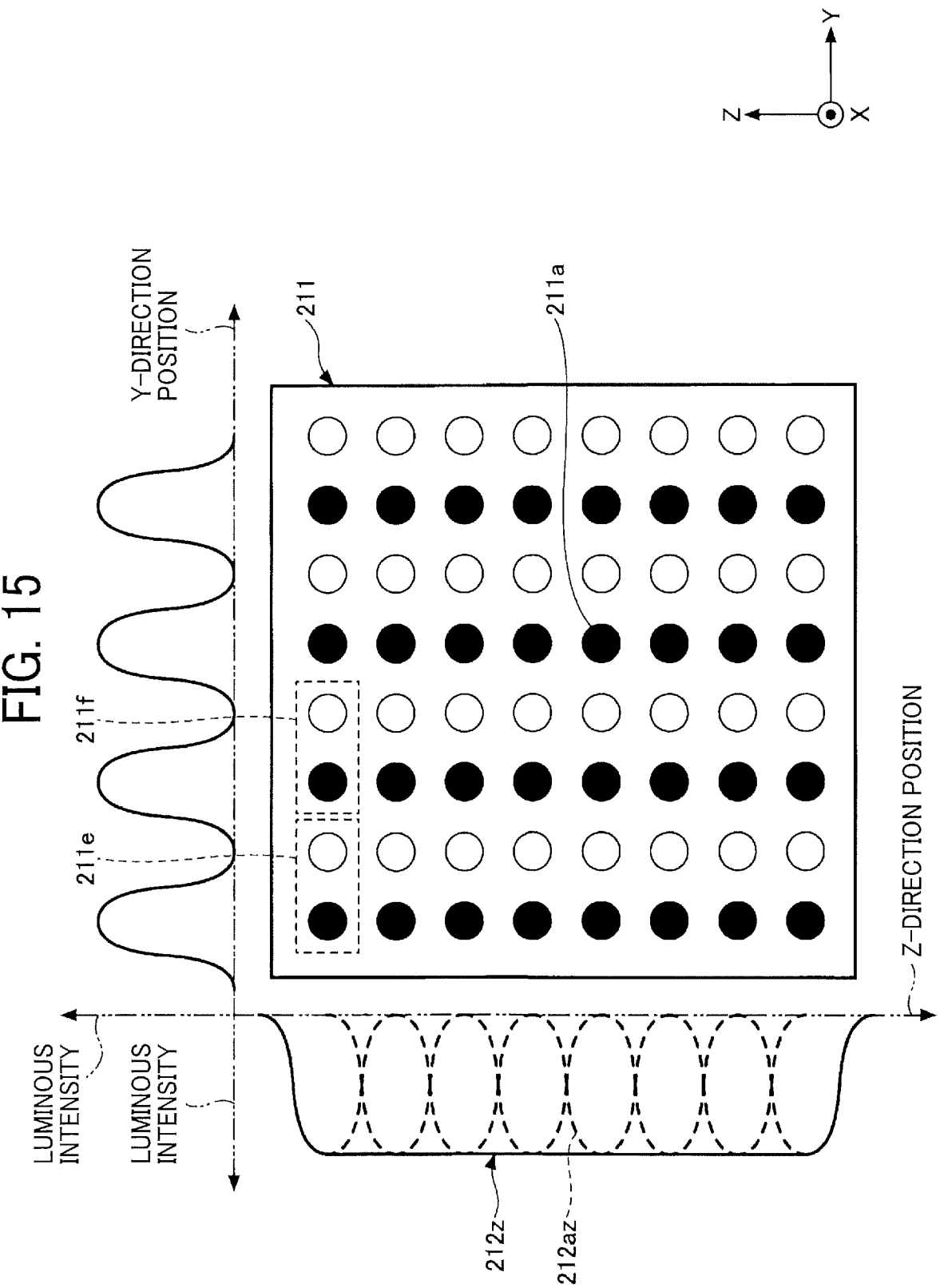
FIG. 15 illustrates an example of a light emitting state of pattern Aa when light emitters in a first-a group are caused to emit light.

FIG. 15 illustrates an example of a light emitting state of pattern Aa when light emitters in a first-a group are caused to emit light. The description of FIG. 15 is similar to that of FIGS. 6 to 10, and will not be made repeatedly.

In FIG. 15, in a set 211e of two light emitters enclosed by a broken-line box, only the left-hand light emitter emits light while the remaining light emitter does not emit light. Likewise, also in an adjacent set 211f of two light emitters, only the left-hand light emitter emits light while the remaining light emitter does not emit light.

In this way, when each set is formed by two light emitters, the state in which only the left-hand light emitter in each set is caused to emit light is referred to as the light emitting state of the pattern Aa. A group of light emitters to be caused to emit light with the pattern Aa is referred to as a first-a group. In FIG. 15, light emitters depicted by black circles are the light emitters included in the first-a group.

Figure 16:
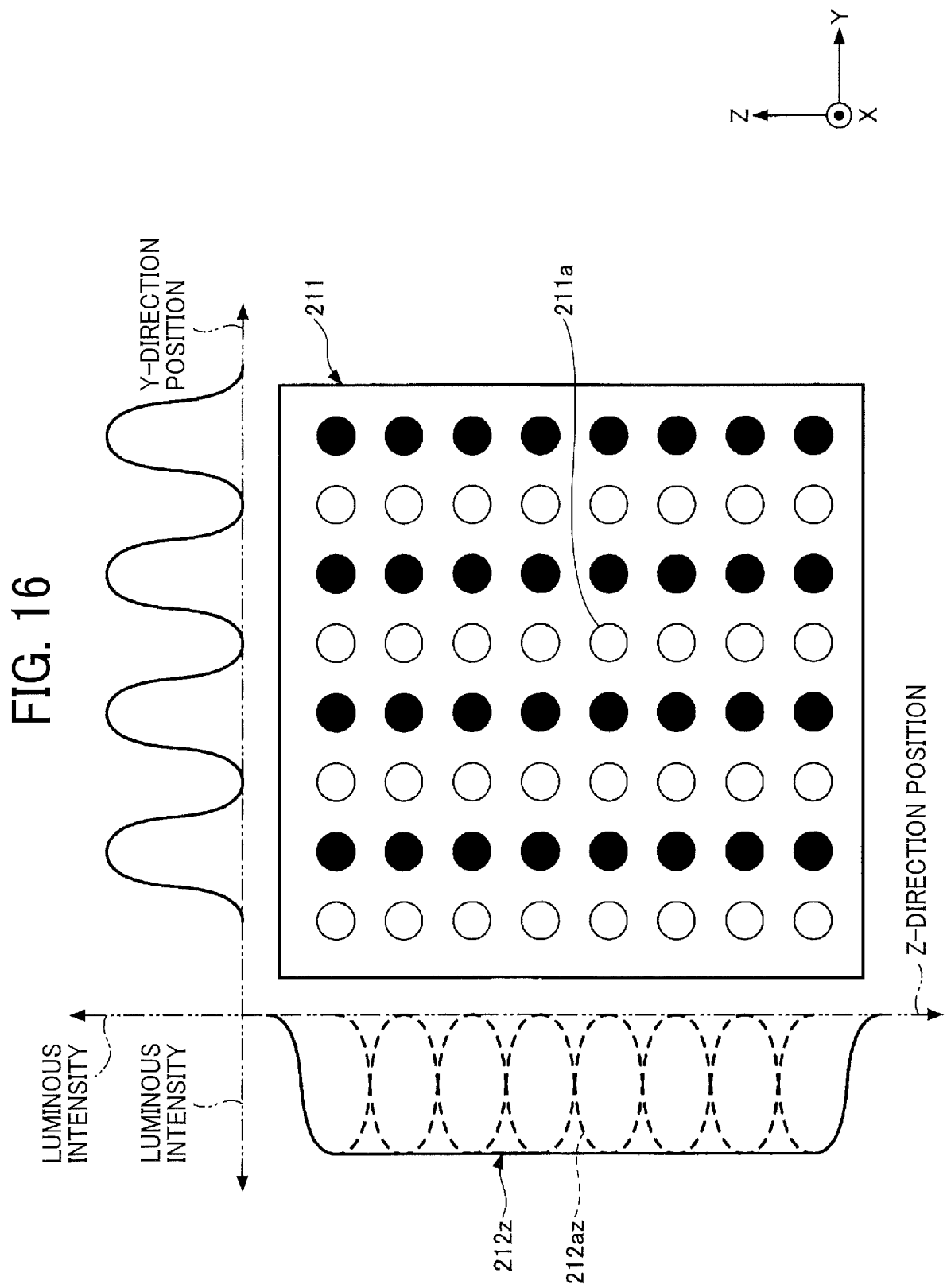
FIG. 16 illustrates an example of a light emitting state of pattern Ba when light emitters in a second-a group are caused to emit light.

FIG. 16 illustrates an example of a light emitting state of pattern Ba when light emitters in a second-a group are caused to emit light. As illustrated in FIG. 16, when each set is formed by two light emitters, the state in which only the right-hand light emitter in each set is caused to emit light is referred to as the light emitting state of the pattern Ba. A group of light emitters to be caused to emit light with the pattern Ba is referred to as the second-a group. In FIG. 16, light emitters depicted by black circles are the light emitters included in the second-a group.

The period during which the pattern Aa and the pattern Ba illustrated in FIGS. 15 and 16 are used until the pattern Aa is used again corresponds to one cycle of shifting the positions of the plurality of light emitters. The distance measurement apparatus 20a drives the VCSEL 211 to emit light to project light while repeating this cycle.

In the light emitting state of each of the patterns Aa and Ba, only some light emitters among the light emitters included in the VCSEL 211 emit light. The light emitters are caused to emit light with the patterns Aa and Ba being sequentially switched, thereby allowing all of the light emitters included in the VCSEL 211 to emit light once within one cycle.

Accordingly, the number of groups is changed, and the number of light emission patterns is changed in accordance with the number of groups, thereby achieving advantageous effects similar to those described in the first embodiment.

Second Embodiment

Next, a distance measurement apparatus 20b according to a second embodiment will be described. Substantially the same components as those in the embodiment described above will not be described.

Figure 17:
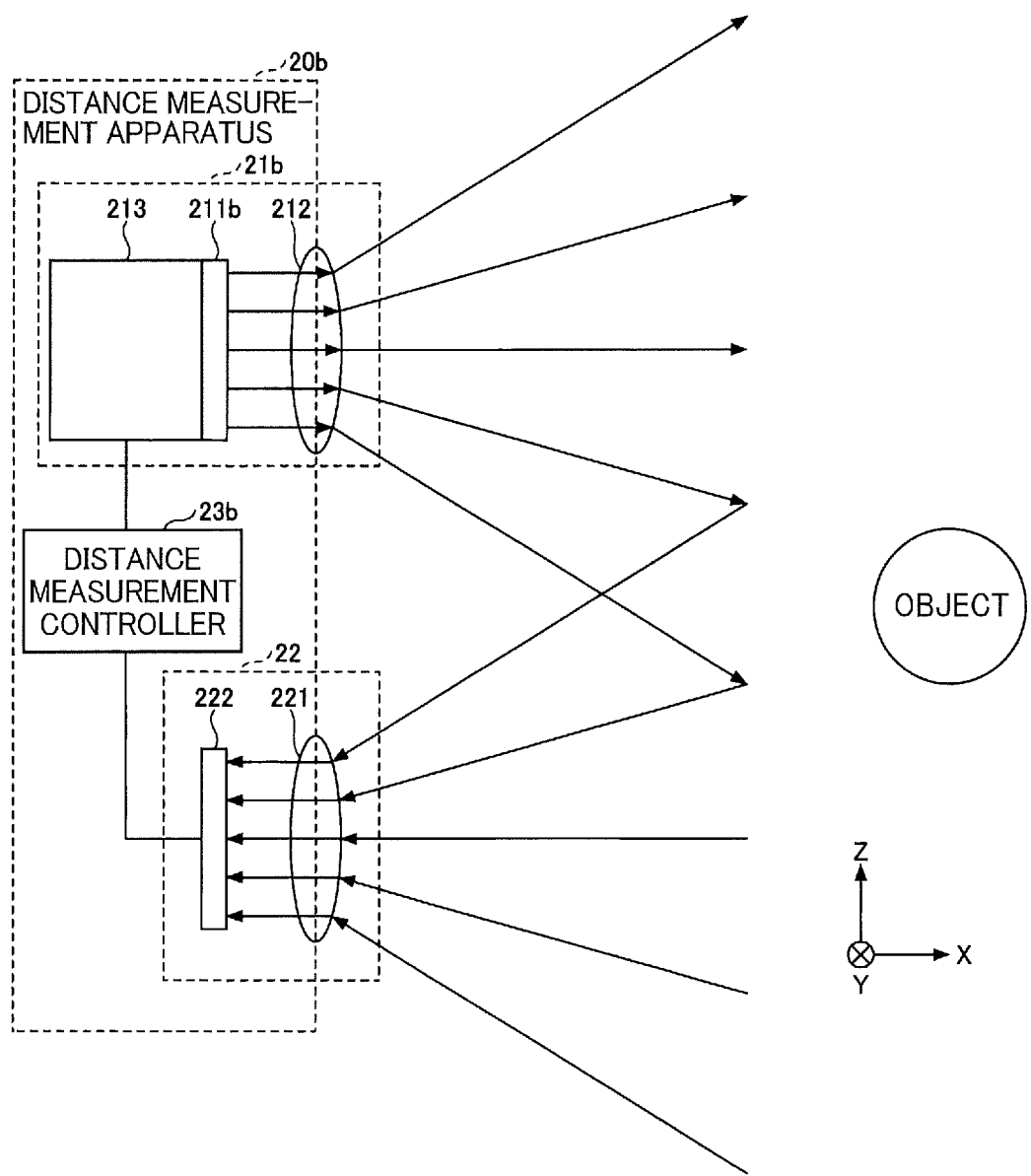
FIG. 17 illustrates an example configuration of a distance measurement apparatus according to a second embodiment.

FIG. 17 illustrates an example configuration of the distance measurement apparatus 20b according to this embodiment. As illustrated in FIG. 17, the distance measurement apparatus 20b includes a light projector 21b and a distance measurement controller 23b. The light projector 21b includes a VCSEL 211b and a movable mechanism 213.

The VCSEL 211b includes a plurality of light emitters that are two-dimensionally arranged in the YZ plane. The VCSEL 211b includes four columns of light emitters in the Y direction and four rows of light emitters in the Z direction. Thus, the VCSEL 211b includes 16 light emitters in total.

The light emitters of the VCSEL 211b are arranged such that every other light emitter is removed in each of the Y direction and the Z direction from the total of 64 light emitters of the VCSEL 211 according to the first embodiment. Accordingly, the interval between light emitters in the VCSEL 211b is twice as large as the interval between light emitters in the VCSEL 211.

The movable mechanism 213 is a stage capable of moving in the YZ plane and uses, as a drive source, a piezoelectric element that is expandable or contractible in accordance with application of a voltage. The VCSEL 211b is attached to the movable mechanism 213, and the movable mechanism 213 is moved in accordance with a drive signal, thereby shifting the position of the VCSEL 211b in the YZ plane.

Figure 18:
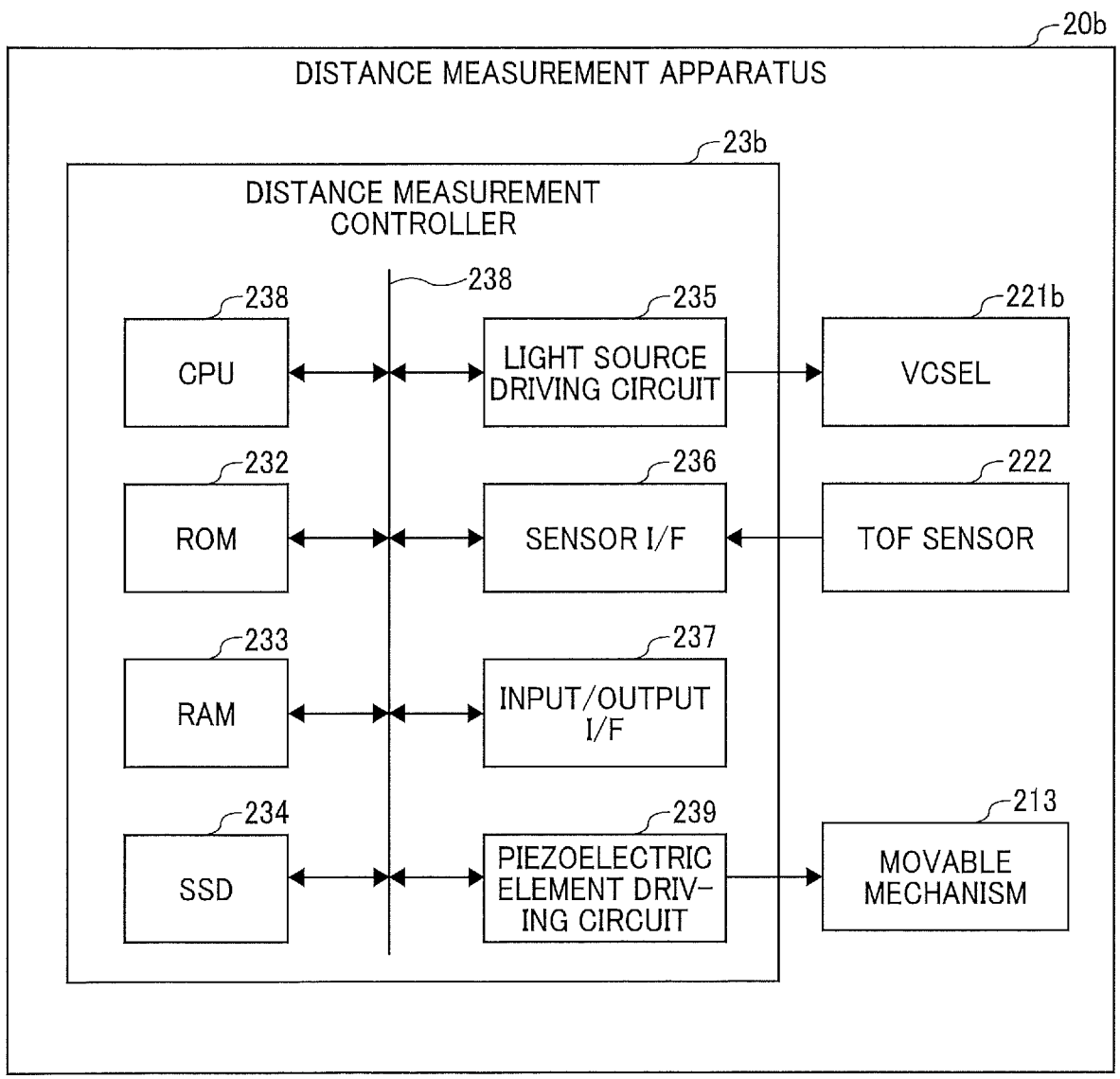
FIG. 18 is a block diagram illustrating an example hardware configuration of a distance measurement controller according to the second embodiment.

FIG. 18 is a block diagram illustrating an example hardware configuration of the distance measurement controller 23b according to this embodiment. As illustrated in FIG. 18, the distance measurement controller 23b includes a piezoelectric element driving circuit 239.

The piezoelectric element driving circuit 239 is an electric circuit electrically connected to the movable mechanism 213 and configured to output a drive signal such as a drive voltage to the movable mechanism 213 in accordance with a control signal from the CPU 231.

Figure 19:
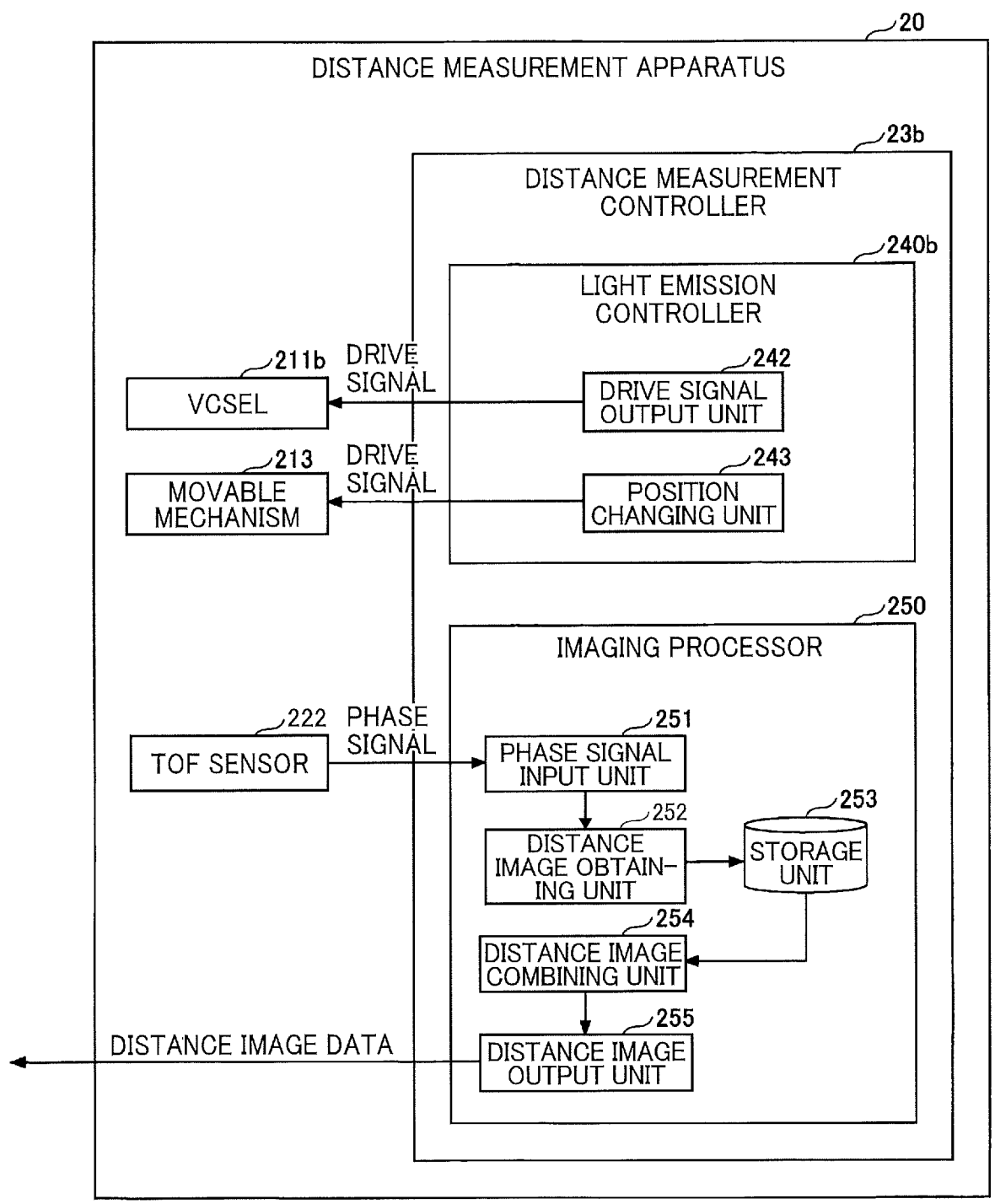
FIG. 19 is a block diagram illustrating an example functional configuration of the distance measurement controller according to the second embodiment.

FIG. 19 is a block diagram illustrating an example functional configuration of the distance measurement controller 23b according to this embodiment. As illustrated in FIG. 19, the distance measurement controller 23b includes a light emission controller 240b. The light emission controller 240b includes a position changing unit 243.

The position changing unit 243, which is implemented by the piezoelectric element driving circuit 239 and the like, drives the movable mechanism 213 to shift the position of the VCSEL 211b in the YZ plane.

The distance measurement controller 23b does not include the group selection unit 241 according to the first embodiment. The position changing unit 243 can drive the movable mechanism 213 to shift the positions of the plurality of light emitters included in the VCSEL 211b.

Next, as an example of spatial light emission control according to this embodiment, light emitting states obtained by shifting the positions of the plurality of light emitters included in the VCSEL 211b will be described with reference to FIGS. 20 to 23.

FIGS. 20 to 23 illustrate the light emitters of the VCSEL 211b, as viewed from the positive Z direction (light projection direction). The 16 light emitters 211a of the VCSEL 211b are two-dimensionally arranged in a square lattice within the YZ plane.

In FIGS. 20 to 23, when a light emitter 211a of the VCSEL 211b is depicted by a black circle, this indicates that the light emitter 211a emits light (turn-on state).

Figure 20:
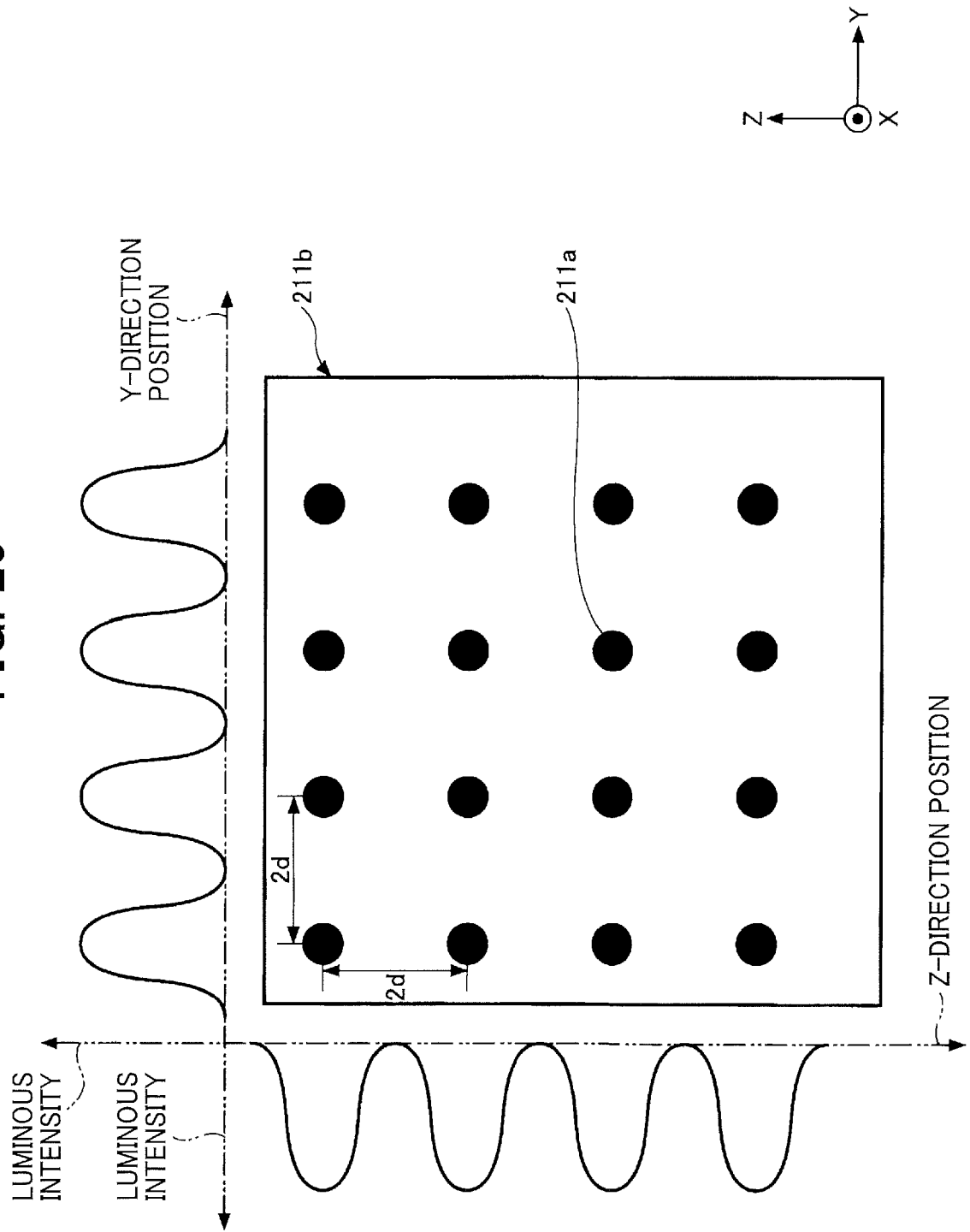
FIG. 20 illustrates an example of a first arrangement of the light emitters included in the VCSEL.

FIG. 20 illustrates an example of a first arrangement of the light emitters 211a included in the VCSEL 211b. As illustrated in FIG. 20, the interval between the light emitters 211a included in the VCSEL 211b is 2d in the Y direction and the Z direction.

Figure 21:
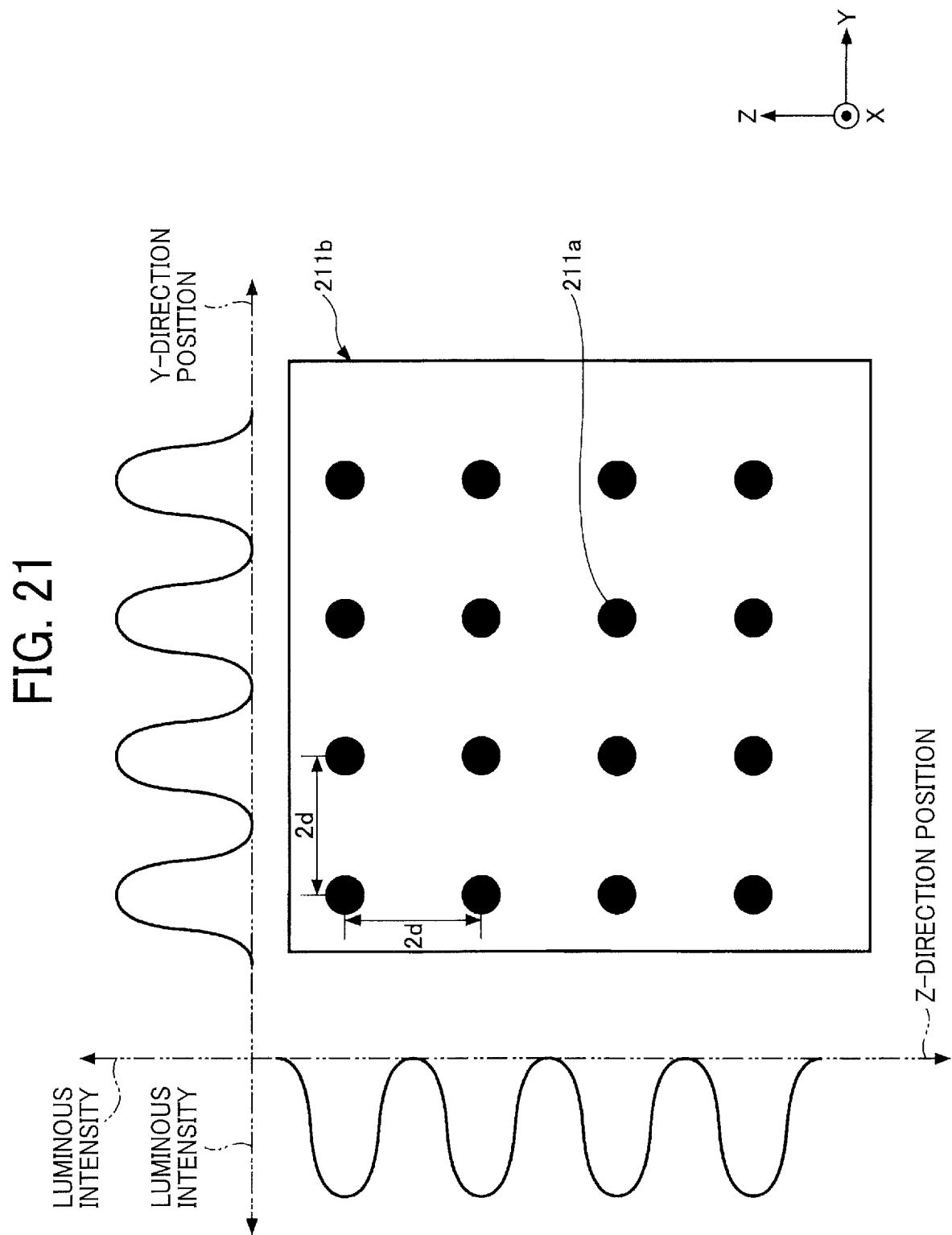
FIG. 21 illustrates an example of a second arrangement of the light emitters included in the VCSEL.

FIG. 21 illustrates an example of a second arrangement of the light emitters 211a included in the VCSEL 211b. In the second arrangement, the VCSEL 211b is moved from the first arrangement by a distance of d, or by half the interval between the light emitters 211a, in the positive Y direction by the position changing unit 243. Accordingly, the position of each of the light emitters 211a included in the VCSEL 211b is shifted by a distance of d in the positive Y direction.

Figure 22:
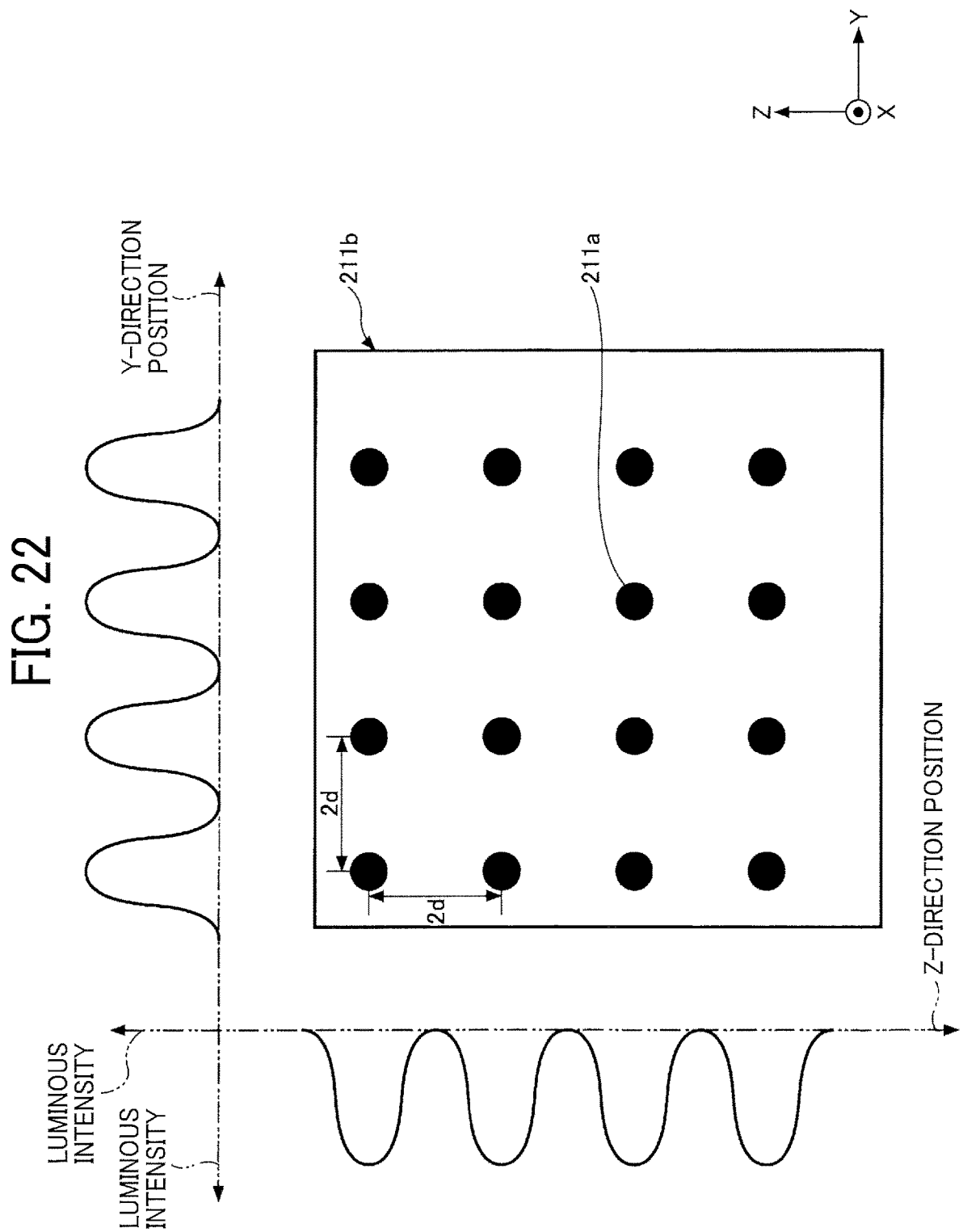
FIG. 22 illustrates an example of a third arrangement of the light emitters included in the VCSEL.

FIG. 22 illustrates an example of a third arrangement of the light emitters 211a included in the VCSEL 211b. In the third arrangement, the VCSEL 211b is moved from the first arrangement by a distance of d in the positive Y direction and by a distance of d in the negative Z direction by the position changing unit 243. Accordingly, the position of each of the light emitters 211a included in the VCSEL 211b is shifted by a distance of d in the positive Y direction and by a distance of d in the negative Z direction.

Figure 23:
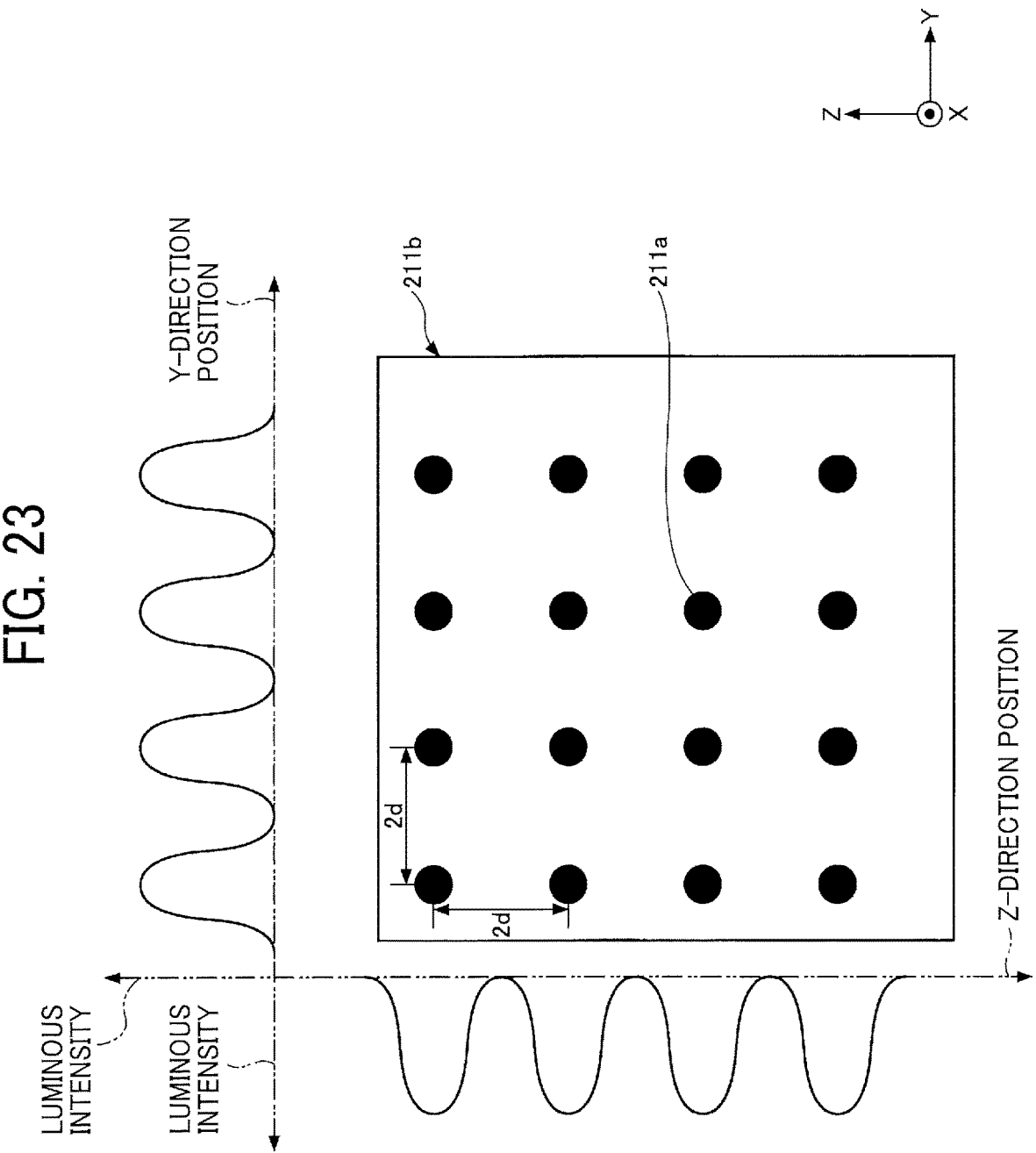
FIG. 23 illustrates an example of a fourth arrangement of the light emitters included in the VCSEL.

FIG. 23 illustrates an example of a fourth arrangement of the light emitters 211a included in the VCSEL 211b. In the fourth arrangement, the VCSEL 211b is moved from the first arrangement by a distance of d in the negative Y direction and by a distance of d in the negative Z direction by the position changing unit 243. Accordingly, the position of each of the light emitters 211a included in the VCSEL 211b is shifted by a distance of d in the negative Y direction and by a distance of d in the negative Z direction.

As described above, the light emission controller 240b can shift the positions of the plurality of light emitters 211a in response to the position changing unit 243 shifting the position of the VCSEL 211b in the YZ plane in chronological order. In addition, the light emission controller 240b causes the light emitters 211a to emit light at every predetermined cycle, thereby allowing the light emitters 211a to emit light a plurality of times.

The light emitting state using the first arrangement, in which the distance between light emitters to be caused to emit light is 2d, is equal to the light emitting state of the pattern A using the first group according to the first embodiment. The light emitting state using the second arrangement, in which each of the light emitters 211a is moved (shifted) by an amount of d in the positive Y direction from the first arrangement, is equal to the light emitting state of the pattern B using the second group according to the first embodiment. Likewise, the light emitting state using the third arrangement is equal to the light emitting state of the pattern C using the third group according to the first embodiment, and the light emitting state using the fourth arrangement is equal to the light emitting state of the pattern D using the fourth group according to the first embodiment.

The amount by which the VCSEL 211b is moved to shift the position is as small as less than or equal to the interval between the light emitters 211a. Thus, the VCSEL 211b can be rapidly shifted in position.

Accordingly, the distance measurement apparatus 20b switches the arrangement of the light emitters 211a to any one of the first to fourth arrangements in response to the position changing unit 243 shifting the position of the VCSEL 211b in the YZ plane in chronological order, thereby achieving advantageous operational effects similar to those achieved by switching the light emission pattern to any one of the patterns A to D according to the first embodiment.

In this embodiment, as a non-limiting example, the movable mechanism 213 is a stage using a piezoelectric element as a drive source. A voice coil motor, an alternating-current (AC) motor, a direct-current (DC) motor, or the like may be used as a drive source.

In this embodiment, furthermore, the VCSEL 211b is moved (shifted) using the movable mechanism 213. Alternatively, the VCSEL 211b may be rotated using a rotation mechanism to shift the position of each of the light emitters 211a included in the VCSEL 211b. In this case, the distance measurement apparatus 20b can also achieve similar advantageous effects.

Third Embodiment

Next, a distance measurement apparatus 20c according to a third embodiment will be described. In this embodiment, as in the first embodiment, the plurality of light emitters included in the VCSEL 211 are divided into four groups, namely, first to fourth groups, and spatial light emission control is performed, with the light emission pattern being switched to the patterns A to D in chronological order.

In the first embodiment, a single light emission pattern is used to emit "distance-data-obtaining reference projected light", which is pulse laser light projected twice, and distance data is obtained on the basis of two phase signals in accordance with light projection. Thereafter, the light emission pattern is switched to the next light emission pattern. More specifically, first, "distance-data-obtaining reference projected light" is emitted using the light emission pattern of the pattern A, and distance data is obtained in accordance with light projection. Thereafter, "distance-data-obtaining reference projected light" is emitted using the light emission pattern of the pattern B, and distance data is obtained in accordance with light projection. Then, "distance-data-obtaining reference projected light" is emitted using the light emission pattern of the pattern C, and distance data is obtained in accordance with light projection. Thereafter, "distance-data-obtaining reference projected light" is emitted using the light emission pattern of the pattern D, and distance data is obtained in accordance with light projection.

In the "distance-data-obtaining reference projected light", pulse laser light projected once includes a pulse laser light group constituted by eight pulse laser beams of light that are modulated by a rectangular wave with a duty ratio of 50%. The eight pulse laser beams of light are projected with the same light emission pattern (for example, the pattern A).

In this embodiment, in constant, the pulse laser light group constituted by eight pulse laser beams of light that are modulated by a rectangular wave with a duty ratio of 50% is constituted by pulse laser beams of light having four light emission patterns, namely, the patterns A to D.

Figure 24:
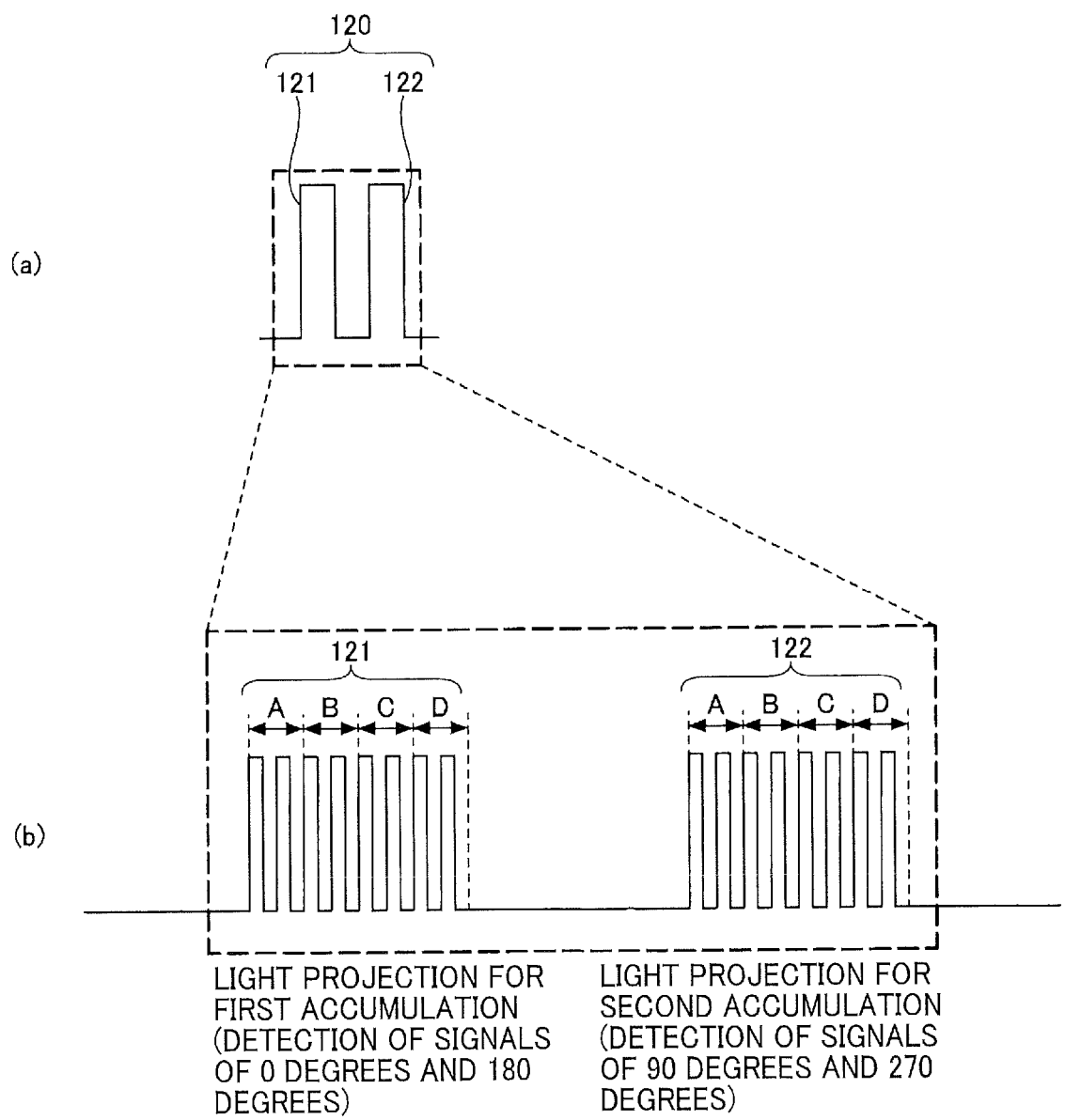
FIG. 24 illustrates an example of temporal light emission control for each group of light emitters according to a third embodiment, in which (a) of FIG. 24 illustrates an overview of a light emission timing, and (b) of FIG. 24 illustrates the details of the light emission timing.

FIG. 24 illustrates an example of temporal light emission control for each group of light emitters according to this embodiment. FIG. 24(a) illustrates an overview of a light emission timing, and FIG. 24(b) illustrates the details of the light emission timing. In FIG. 24, the horizontal axis represents time, and the vertical axis represents the amount of light.

In FIG. 24(a), distance-data-obtaining reference projected light 120 includes pulse laser light 121 and pulse laser light 122. The pulse laser light 121 allows the TOF sensor 222 to detect phase signals of 0 degrees and 180 degrees. The pulse laser light 122 allows the TOF sensor 222 to detect phase signals of 90 degrees and 270 degrees.

As illustrated in FIG. 12(b), the pulse laser light 121 includes a group of eight pulse laser beams of light that are modulated by a rectangular wave with a duty ratio of 50%. Among the eight pulse laser beams of light, the first two pulse laser beams of light are projected by the first group using the pattern A, and the next two pulse laser beams of light are projected by the second group using the pattern B. The next two pulse laser beams of light are projected by the third group using the pattern C, and the next two pulse laser beams of light are projected by the fourth group using the pattern D.

In this case, the light emission pattern is switched during the accumulation of an electric charge in each pixel of the TOF sensor 222, and the light intensities of reflected light of light projected using the patterns A to D are averaged by the accumulation periods. Consequently, an electric charge accumulation effect equivalent to that when pieces of distance image data obtained with the light emission pattern switched for each "distance-data-obtaining reference projected light" are combined is achieved. This advantageously eliminates the need to, compared to the first embodiment, combine pieces of distance image data obtained in accordance with projection of light with the patterns A to D.

In the first embodiment, in contrast, light is projected eight times using the same light emission pattern, and the respective electric charges of the reflected light can be accumulated in each pixel of the TOF sensor 222, thereby increasing the amount of electric charge to be accumulated by four times the amount of electric charge according to the third embodiment. More specifically, in the third embodiment, as illustrated in FIG. 24(*b*), the pulse laser light 121 includes two light beams projected with the pattern A, whereas, in the first embodiment, as illustrated in FIG. 13(*b*), the pulse laser light 111A includes eight light beams projected with the pattern A. In the first embodiment, therefore, compared to the third embodiment, the amount of electric charge to be accumulated can be quadrupled in accordance with the number of times light is projected, thereby improving the distance detection accuracy.

In FIG. 12(*b*), the pulse laser light group with a duty ratio of 50% is equally divided into four subgroups for the patterns A to D such that emission of each of the pulse laser beams of light included in the pulse laser light group is synchronized with switching of the light emission pattern. If the light emission pattern can be switched much more quickly than emission of each pulse laser beam of light, emission of each pulse laser beam of light and switching of the light emission pattern may not synchronized with each other.

While embodiments have been described, the present disclosure is not limited to the embodiments described above that are specifically disclosed herein, and various modifications or changes may be made without departing from the scope of the claims.

For example, in the embodiments, as a non-limiting example, the plurality of light emitters included in the VCSEL 211 or the like are two-dimensionally arranged in a square lattice. For example, the light emitters may be two-dimensionally arranged in an equilateral triangular lattice or in a hexagonal close-packed structure. In addition, the light emission patterns, the grouping method, and so on may be variously modified in accordance with how the light emitters are arranged.

In the embodiments, furthermore, as a non-limiting example, an automated guided vehicle configured to transport items to an intended destination without the intervention of a human operator is used as a mobile object provided with a distance measurement apparatus. A distance measurement apparatus according to an embodiment may be mounted in a vehicle such as a motor vehicle or an aircraft such as a drone. A distance measurement apparatus according to an embodiment may be mounted not only in a mobile object but also in an information terminal such as a smart phone or a tablet.

In the embodiments, furthermore, as a non-limiting example, a distance measurement apparatus includes the configuration and function of a distance measurement controller. A portion, or all, of the configuration and function of a distance measurement controller may be included in an apparatus provided with a distance measurement apparatus or an apparatus connected to the distance measurement apparatus, such as the main controller 80 included in the mobile object 1.

Furthermore, the embodiments include a distance measurement method. For example, the distance measurement method includes projecting light, receiving the light projected and reflected from a target object, photoelectrically converting the received light to an electrical signal, obtaining a plurality of phase signals from the electrical signal, obtaining distance data indicating a distance to the target object on the basis of the plurality of phase signals, and outputting the obtained distance data. The projecting includes causing a plurality of light emitters that are arranged two-dimensionally to emit light, and causing the plurality of light emitters to emit light a plurality of times while shifting positions of the plurality of light emitters. The distance measurement method can achieve advantageous effects similar to those of the distance measurement apparatus described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a TCP/IP signal carrying computer code over an IP network, such as the Internet. The carrier medium may also include a storage medium for storing processor readable code such as a floppy disk, hard disk, CD ROM, magnetic tape device or solid state memory device.

The invention claimed is:

1. A measurement apparatus comprising:
   a light projector including a light source, the light source including a plurality of light emitters and circuitry configured to control a light emission of the plurality of light emitters;
   a photodetector configured to
     receive light projected from the light projector and reflected from a target object,
   wherein the circuitry of the light projector is configured to:
     cause the plurality of light emitters to emit light, and
       cause shifting of light emitting positions of the plurality of light emitters, the shifting including shifting from a first pattern to a second pattern; and wherein a distance between a first position and a second position closest to the first position is greater than a distance between the first position and a third position closest to the first position, the first position and the second position being positions of the light emitters that emit light according to the first pattern and do not emit light according to the second pattern, the third position being a position of the light emitter that emits light according to the second pattern and does not emit light according to the first pattern.

2. The measurement apparatus according to claim 1, wherein the light projector further includes a light projection optical system configured to convert the light emitted from the plurality of light emitters into divergent light and to project the divergent light toward the target object.

3. The measurement apparatus according to claim 1, wherein the circuitry is configured to change a light emitter to be caused to emit light among the plurality of light emitters to shift the light emitting positions of the plurality of light emitters.

4. The measurement apparatus according to claim 1, wherein the circuitry is configured to move the light source, and shift the light emitting positions of the plurality of light emitters in response to the position changing unit moving the light source.

5. The measurement apparatus according to claim 1, wherein the circuitry is configured to cause at least two of the plurality of light emitters to simultaneously emit light.

6. The measurement apparatus according to claim 1, wherein the circuitry is configured to shift the light emitting positions of the plurality of light emitters on a cyclical basis such that each of the plurality of light emitters is caused to emit light once within one cycle.

7. The measurement apparatus according to claim 1, wherein the plurality of light emitters are divided into a plurality of groups each including one or more light emitters among the plurality of light emitters, and wherein the circuitry is configured to cause the one or more light emitters included in each of the plurality of groups to simultaneously emit light.

8. The measurement apparatus according to claim 7, wherein the circuitry is configured to switch, on a cyclical basis, a group in which one or more light emitters are to be caused to simultaneously emit light among the plurality of groups such that each of the plurality of light emitters is caused to emit light once within one cycle.

9. The measurement apparatus according to claim 1, wherein the plurality of light emitters are light emitters included in a vertical cavity surface emitting laser (VCSEL).

10. A measurement method comprising:
projecting light;
receiving the light projected and reflected from a target object;
wherein the projecting includes:
causing a plurality of light emitters to emit light, and cause shifting of light emitting positions of the plurality of light emitters, the shifting including shifting from a first pattern to a second pattern, the light emitting positions of second pattern not overlapping with the light emitting positions of the first pattern; and wherein a distance between a first position and a second position closest to the first position is greater than a distance between the first position and a third position closest to the first position, the first position and the second position being positions of the light emitters that emit light according to the first pattern and do not emit light according to the second pattern, the third position being a position of the light emitter that emits light according to the second pattern and does not emit light according to the first pattern.

11. The measurement apparatus according to claim 1, wherein the circuitry is configured to cause a first light emitter among the plurality of light emitters to emit light and not to cause a second light emitter, among the plurality of light emitters, that is immediately next to the first light emitter to emit light.

12. The measurement apparatus according to claim 1, further comprising an interface configured to output distance data indicating a distance to the target object, the distance data being obtained based on signals from the photodetector.

13. A light projector comprising:
a light source including a plurality of light emitters;
wherein light emitting pattern of the light projector shifts, the shifting including shifting from a first pattern to a second pattern, and wherein
a distance between a first position and a second position closest to the first position is greater than a distance between the first position and a third position closest to the first position, the first position and the second position being positions of the light emitted by the light projector according to the first pattern and not according to the second pattern, the third position being a position of the light emitted by the light projector according to the second pattern and not according to the first pattern.

14. The light projector according to claim 13, further comprising a light projection optical system configured to convert the light emitted from the plurality of light emitters into divergent light and to project the divergent light toward the target object.

15. The light projector according to claim 13, wherein the circuitry is configured to change a light emitter to be caused to emit light among the plurality of light emitters to shift the light emitting positions of the plurality of light emitters.

16. The light projector according to claim 13, wherein the circuitry is configured to move the light source, and shift the light emitting positions of the plurality of light emitters in response to the position changing unit moving the light source.

17. The light projector according to claim 13, wherein the plurality of light emitters emit light a plurality of times within a period in which the light emitting pattern of the light projector includes a plurality of patterns.

18. The light projector according to claim 13, wherein the plurality of light emitters includes light emitters arranged in a row in a direction perpendicular to a first direction and light emitters arranged in a row in a direction neither parallel nor perpendicular to the first direction, the first direction being a shift direction from the first pattern to the second pattern.

19. The light projector according to claim 18, wherein the arrangement of the plurality of light emitters includes a first row and a second row perpendicular to the first direction and adjacent to each other, the light emitters arranged in the first row and the light emitters arranged in the second row being adjacent to each other in the first direction.

20. A light projector comprising:
a light source including a plurality of light emitters;
wherein light projecting pattern of the light projector changes,
the changing including changing from a first pattern to a second pattern, and wherein
a distance between a first position and a second position closest to the first position is greater than a distance between the first position and a third position closest to the first position, the first position and the second position being positions of the light projected by the light projector according to the first pattern and not according to the second pattern, the third position being a position of the light projected by the light projector according to the second pattern and not according to the first pattern.

21. The light projector according to claim 20, wherein the light source is a laser including the plurality of light emitters arranged two dimensionally.

22. The light projector according to claim 20, further comprising a light projection optical system configured to convert the light emitted from the plurality of light emitters into divergent light and to project the divergent light toward the target object, and wherein the light projected according to the first pattern and the light projected according to the second pattern are each projected from the same light projection optical system.

\* \* \* \* \*